(12) United States Patent
Hou

(10) Patent No.: US 12,379,459 B2
(45) Date of Patent: Aug. 5, 2025

(54) IN-VEHICLE RADAR SIGNAL CONTROL METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Chen Hou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 398 days.

(21) Appl. No.: 17/952,255

(22) Filed: Sep. 25, 2022

(65) Prior Publication Data

US 2023/0036901 A1  Feb. 2, 2023

Related U.S. Application Data

(63) Continuation of application No. PCT/CN2021/123222, filed on Oct. 12, 2021.

(30) Foreign Application Priority Data

Oct. 29, 2020 (CN) .......................... 202011184227.8

(51) Int. Cl.
  *G01S 7/02* (2006.01)
  *G01S 13/931* (2020.01)

(52) U.S. Cl.
  CPC .......... *G01S 7/0236* (2021.05); *G01S 13/931* (2013.01); *G01S 2013/9316* (2020.01)

(58) Field of Classification Search
  CPC ................. G01S 7/0236; G01S 13/931; G01S 2013/9316

(Continued)

(56) References Cited

U.S. PATENT DOCUMENTS 9,637,053 B2 * 5/2017 Schofield .................. B60R 1/29
9,668,146 B2 * 5/2017 Lau ....................... G05D 1/0274
(Continued)

FOREIGN PATENT DOCUMENTS

CN        104793208 A    7/2015
CN        109375204 A    2/2019
(Continued)

OTHER PUBLICATIONS

The World Intellectual Property Organization (WIPO) International Search Report for PCT/CN2021/106148 Jan. 5, 2022 6 Pages (including translation).

*Primary Examiner* — Nuzhat Pervin
(74) *Attorney, Agent, or Firm* — ANOVA LAW GROUP PLLC

(57) ABSTRACT

An in-vehicle radar signal control method includes: determining a target interference area of a first vehicle, a vehicle in the target interference area interfering with an in-vehicle radar signal of the first vehicle; determining vehicles in the target interference area as a first vehicle cluster, and determining strength of in-vehicle radar signals of vehicles in the first vehicle cluster; determining whether a new second vehicle enters the target interference area; and in response to a determination that the second vehicle enters the target interference area, obtaining an adjustment signal; the adjustment signal indicating one or more of: increasing or reducing strength of the in-vehicle radar signal of the first vehicle, adjusting a travel speed of the first vehicle, and adjusting a travel direction of the first vehicle.

20 Claims, 11 Drawing Sheets

(58) Field of Classification Search
USPC .......................................................... 342/70
See application file for complete search history.

(56) References Cited

U.S. PATENT DOCUMENTS

| | | | |
|---|---|---|---|
| 10,746,848 B2* | 8/2020 | Katayama | G01S 13/93 |
| 11,131,992 B2* | 9/2021 | Du | G08G 1/0129 |
| 11,307,300 B2* | 4/2022 | Klotzbuecher | G01S 13/42 |
| 11,586,931 B2* | 2/2023 | Refaat | G05D 1/0221 |
| 2005/0168377 A1* | 8/2005 | Kai | G01S 7/4008 |
| | | | 342/128 |
| 2015/0048968 A1* | 2/2015 | Uyama | G01S 7/354 |
| | | | 342/109 |
| 2017/0084175 A1* | 3/2017 | Sedlik | H04B 1/3822 |
| 2017/0153315 A1* | 6/2017 | Katayama | G01S 13/38 |
| 2018/0120419 A1* | 5/2018 | Bialer | G01S 13/931 |
| 2018/0284785 A1* | 10/2018 | Berntorp | G08G 1/166 |
| 2018/0299533 A1* | 10/2018 | Pliefke | G01S 7/40 |
| 2019/0023273 A1* | 1/2019 | Ishioka | G08G 1/167 |
| 2019/0100216 A1* | 4/2019 | Volos | G06Q 40/08 |
| 2019/0270452 A1* | 9/2019 | Katsura | B60W 30/10 |
| 2020/0025910 A1* | 1/2020 | Roh | G01S 13/931 |
| 2020/0110153 A1* | 4/2020 | Seler | G01S 7/4026 |
| 2021/0227365 A1* | 7/2021 | Vassilovski | H04B 17/345 |
| 2021/0327280 A1* | 10/2021 | Choi | G08G 1/163 |
| 2022/0276367 A1* | 9/2022 | Hasegawa | G01S 13/87 |
| 2024/0353548 A1* | 10/2024 | Hamilton | G01S 13/003 |

FOREIGN PATENT DOCUMENTS

| | | | | |
|---|---|---|---|---|
| CN | 110794403 A | | 2/2020 | |
| CN | 110888113 A | * | 3/2020 | ............ G01S 13/88 |
| CN | 112285717 A | | 1/2021 | |
| EP | 3293545 A1 | * | 3/2018 | ........... G01S 13/536 |
| EP | 3306339 A1 | * | 4/2018 | |
| EP | 4099056 A1 | * | 12/2022 | ........... G01S 13/343 |
| WO | WO-9637053 A2 | * | 11/1996 | ............ H04W 52/20 |

* cited by examiner

First vehicle cluster      Second vehicle cluster

IN-VEHICLE RADAR SIGNAL CONTROL METHOD, ELECTRONIC DEVICE, AND STORAGE MEDIUM

RELATED APPLICATION(S)

This application is a continuation application of PCT Patent Application No. PCT/CN2021/123222 filed on Oct. 12, 2021, which claims priority to Chinese Patent Application No. 202011184227.8, filed with the China National Intellectual Property Administration on Oct. 29, 2020, and entitled "IN-VEHICLE RADAR SIGNAL CONTROL METHOD, ELECTRONIC DEVICE, AND STORAGE MEDIUM", all of which are incorporated herein by reference in entirety.

FIELD OF THE TECHNOLOGY

The present disclosure relates to autonomous driving technologies, and in particular, to an in-vehicle radar signal control method, an electronic device, and a computer storage medium.

BACKGROUND

The Internet of Vehicles organically connects "people, vehicles, roads, and cloud" through a new generation of information and communication technology. Therefore, the Internet of Vehicles can obtain more perceived information than a single vehicle, enhance safe driving, and promote innovation and implementation of autonomous driving. The Internet of Vehicles is also conducive to the construction of an intelligent transportation system and is of great significance for improving traffic efficiency and driving experience and facilitating energy saving and emission reduction.

An in-vehicle radar signal functions to maintain vehicle driving safety and reduce a traffic accident rate (for example, obstacle detection, collision prediction, and adaptive cruise control). Signal strength of an in-vehicle radar is one of main indicators of implementation of these functions of the in-vehicle radar.

SUMMARY

Embodiments of the present disclosure provide an in-vehicle radar signal control method, an electronic device, and a computer storage medium.

In one aspect, the present disclosure provides an in-vehicle radar signal control method, including: determining a target interference area of a first vehicle, a vehicle in the target interference area interfering with an in-vehicle radar signal of the first vehicle; determining vehicles in the target interference area as a first vehicle cluster, and determining strength of in-vehicle radar signals of vehicles in the first vehicle cluster, the first vehicle cluster including the first vehicle and a vehicle other than the first vehicle in the target interference area; determining whether a new second vehicle enters the target interference area; and in response to a determination that the new second vehicle enters the target interference area, obtaining an adjustment signal to adjust a travel state of the first vehicle, where the adjustment signal is generated based on strength of in-vehicle radar signals of vehicles in the first vehicle cluster and strength of an in-vehicle radar signal of the second vehicle. The adjustment signal indicates at least one of the following items: increasing or reducing strength of the in-vehicle radar signal of the first vehicle, adjusting a travel speed of the first vehicle, and adjusting a travel direction of the first vehicle.

In another aspect, the present disclosure provides an in-vehicle radar signal control method, including: determining whether a second vehicle is about to enter an interfered state, the interfered state indicating that a first vehicle in a predetermined area around the second vehicle will interfere with an in-vehicle radar signal of the second vehicle; in response to a determination that the second vehicle is about to enter the interfered state, determining vehicles in the predetermined area as a first vehicle cluster, and determining strength of in-vehicle radar signals of vehicles in the first vehicle cluster, the first vehicle cluster including the first vehicle and a vehicle other than the first vehicle in a target interference area; and obtaining an adjustment signal to adjust a travel state of the second vehicle, where the adjustment signal is generated based on strength of in-vehicle radar signals of vehicles in the first vehicle cluster and strength of an in-vehicle radar signal of the second vehicle. For example, the adjustment signal indicates at least one of the following items: increasing or reducing strength of the in-vehicle radar signal of the second vehicle, adjusting a travel speed of the second vehicle, and adjusting a travel direction of the second vehicle.

In yet another aspect, the present disclosure provides an electronic device. The electronic device includes: one or more processors; and one or more memories, where the memories store computer readable code, and the computer readable code, when executed by the one or more processors, performs the above methods.

In yet another aspect, the present disclosure also provides a computer-readable storage medium storing instructions, where the instructions, when executed by a processor, cause the processor to perform the above methods.

In yet another aspect, the present disclosure provides a computer program product or a computer program, including computer instructions, and the computer instructions being stored in a computer-readable storage medium. A processor of a computing device reads the computer instructions from the computer readable medium, and executes the computer instructions to cause the computing device to perform the methods provided in the above various aspects or in various optional implementations of the above various aspects.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
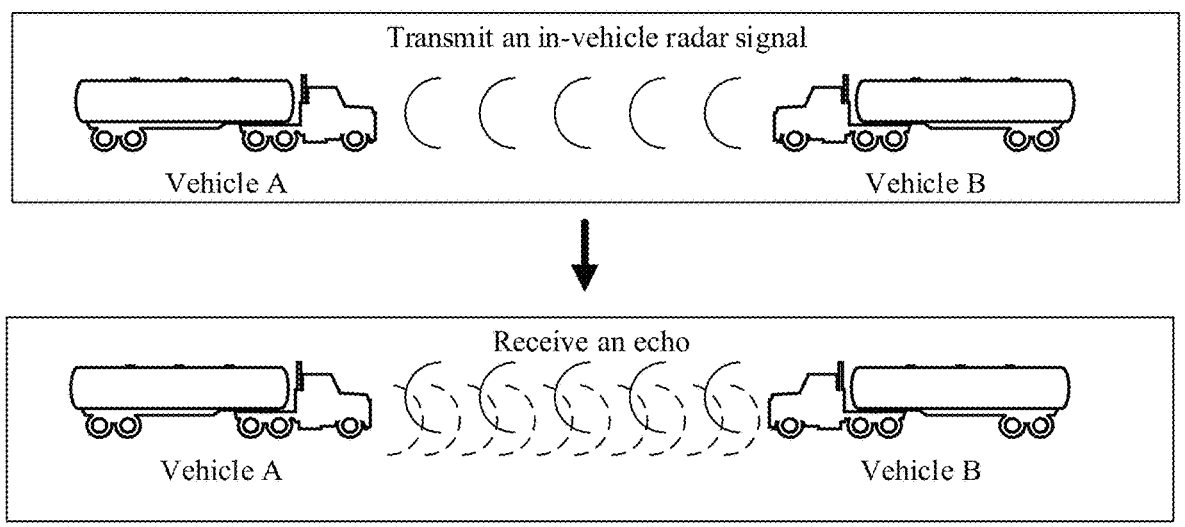
FIG. 1 is a schematic diagram of a principle of detecting a driving risk based on an in-vehicle radar signal.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In the present disclosure and the accompanying drawings, steps and elements that are basically the same or similar are denoted by the same or similar reference numerals, and are not described repeatedly. In the descriptions of the present disclosure, terms "first" and "second" are merely used for distinguishing descriptions and cannot be understood as indicating or implying relative importance or a sequence.

FIG. 1 is an example schematic diagram of a principle of detecting a driving risk based on an in-vehicle radar signal.

Referring to FIG. 1, a vehicle B periodically or continuously transmits an in-vehicle radar signal (as shown by curved solid lines shown in FIG. 1). The in-vehicle radar signal may be a millimeter wave signal in a band range of 24 GHz to 77 GHz. A person skilled in the art understands that the in-vehicle radar signal may also be a signal in another band. After the in-vehicle radar signal encounters a target (a vehicle A shown in FIG. 1), the target reflects an echo (for example, curved dashed lines shown in FIG. 1). Generally, a frequency of the echo is higher than that of the in-vehicle radar signal. Therefore, the echo and the in-vehicle radar signal may be distinguished in frequency. After receiving the echo, the vehicle B performs processing such as filtering on the signal to reduce noise and obtain physical environment information such as a relative speed, a relative distance, a relative angle, and a relative movement direction of the surrounding target object. The vehicle B identifies and classifies these pieces of information and combines the data, to intelligently identify whether there is a driving risk and perform autonomous driving. In addition, an echo processing module may also remind a driver through voice, lighting, or the like, which can improve driving safety.

The solutions provided in the embodiments of the present disclosure relate to technologies such as autonomous driving of artificial intelligence, and are described in the following embodiments. In certain embodiment(s), autonomous driving technologies usually include high-precision maps, environment perception, behavior decision-making, path planning, motion control, and other technologies. Self-determined driving technology has a wide range of implementation prospects. Artificial intelligence (AI) is a theory, method, technology, and implementation system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have functions of perception, reasoning, and decision-making, such as a function of reasoning and making a decision on a behavior of a driver.

The echo processing module in the present disclosure may be any electronic device, for example, a smart phone, a tablet computer, a notebook computer, a palmtop computer, a mobile internet device (MID), an in-vehicle processor, implementation software installed on an in-vehicle system, or implementation software installed on a mobile terminal. The implementation software may be, for example, map navigation software.

The embodiments of the present disclosure provide an in-vehicle radar signal control method, an electronic device, and a computer storage medium, which can dynamically and intelligently control an in-vehicle radar signal. Therefore, a vehicle or a traffic control department can more know a possible driving risk and reduce the probability of traffic accidents.

Figure 2A:
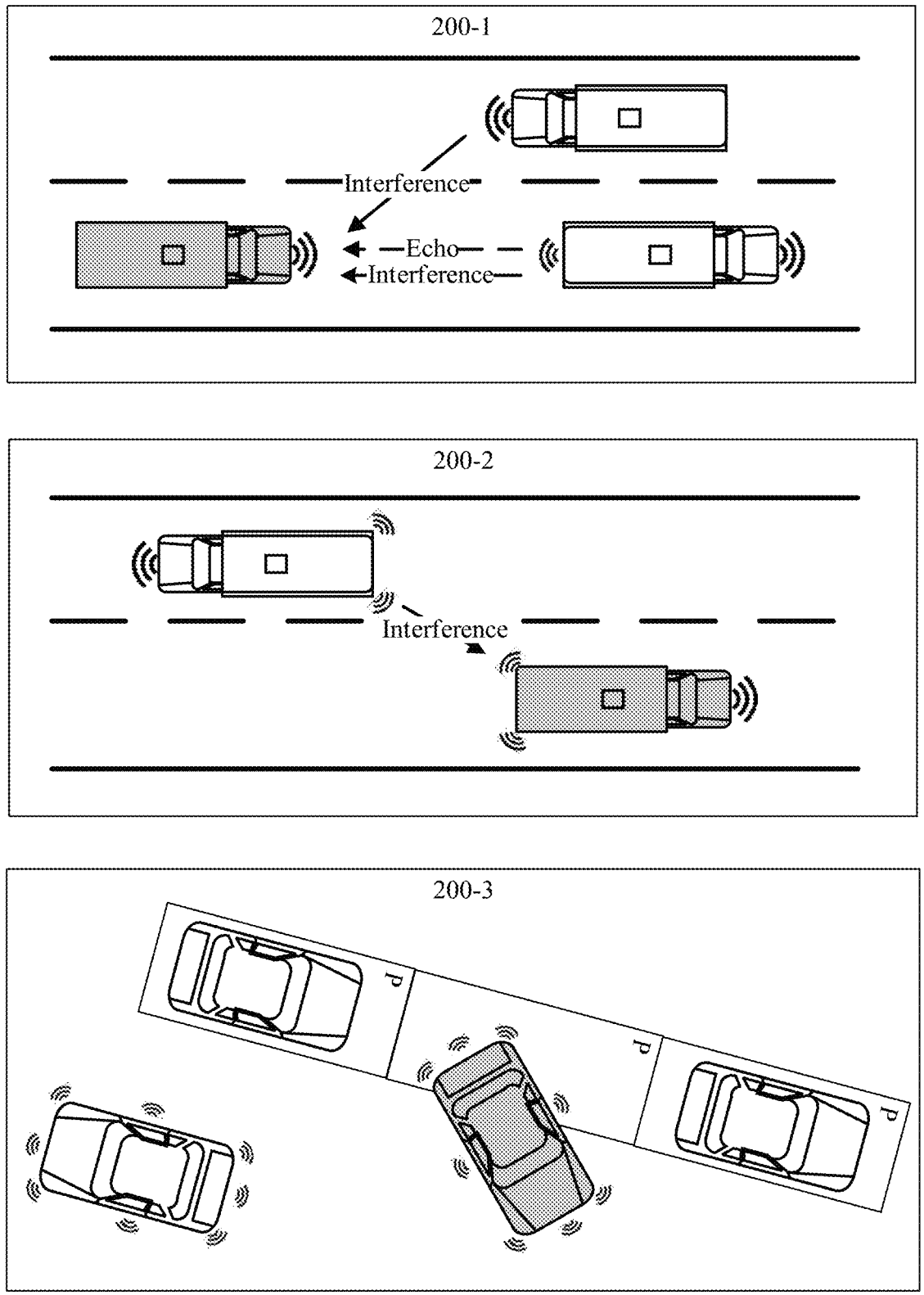
FIG. 2A is a schematic diagram of multiple scenarios according to certain embodiment(s) of the present disclosure.
Figure 2B:
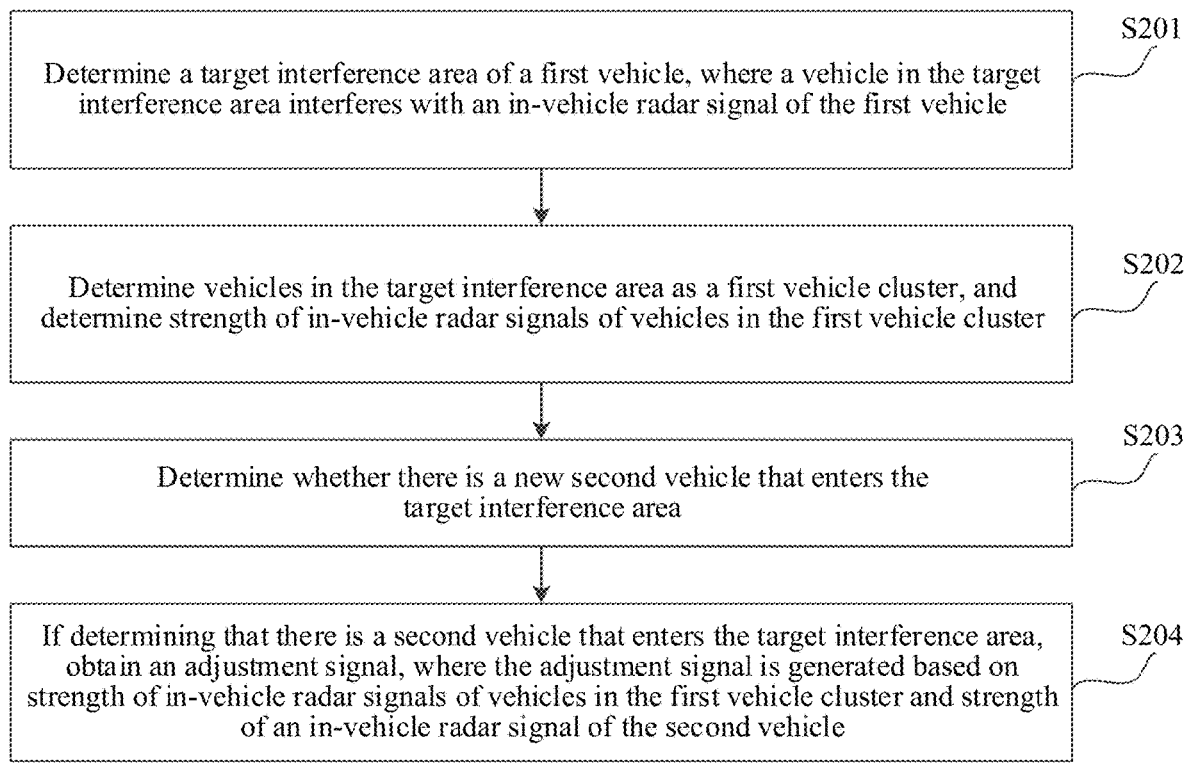
FIG. 2B is a schematic flowchart of an in-vehicle radar signal control method according to certain embodiment(s) of the present disclosure.
Figure 2C:
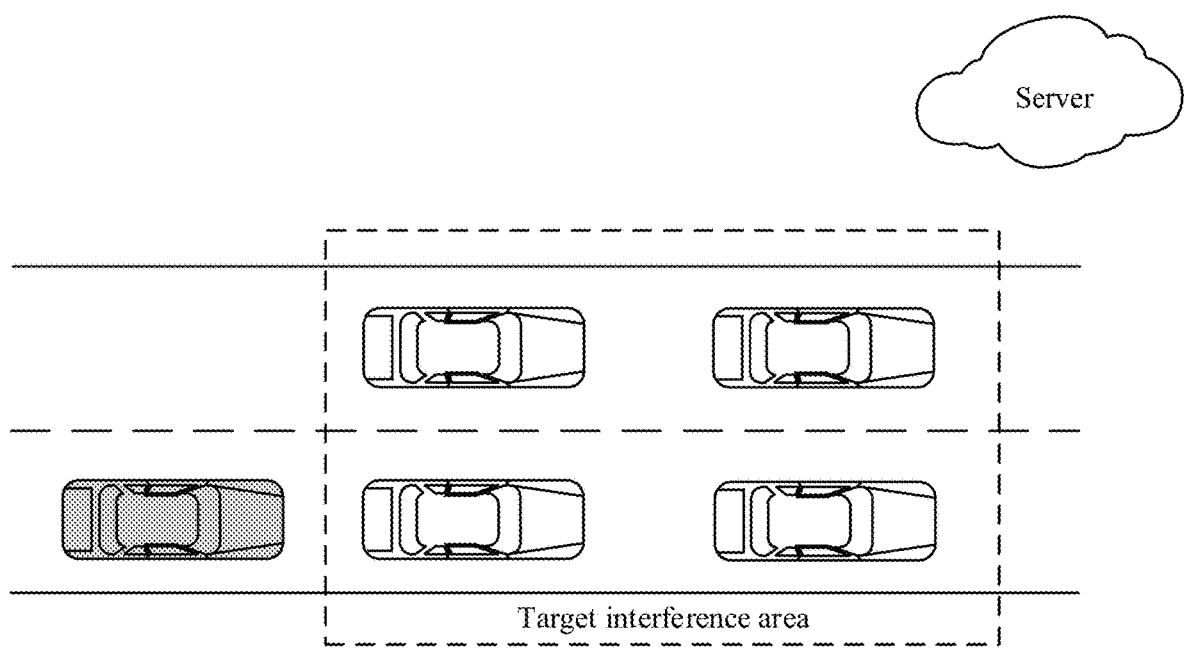
FIG. 2C is a schematic diagram of an in-vehicle radar signal control method according to certain embodiment(s) of the present disclosure.

FIG. 2A is a schematic diagram of a scenario 200-1, a scenario 200-2, and a scenario 200-3 to which in-vehicle radar signal control according to an embodiment of the present disclosure may be applied. FIG. 2B is a flowchart of an in-vehicle radar signal control method 20 according to an embodiment of the present disclosure. FIG. 2C is a schematic diagram of an in-vehicle radar signal control method 20 according to an embodiment of the present disclosure.

Figure 2D:
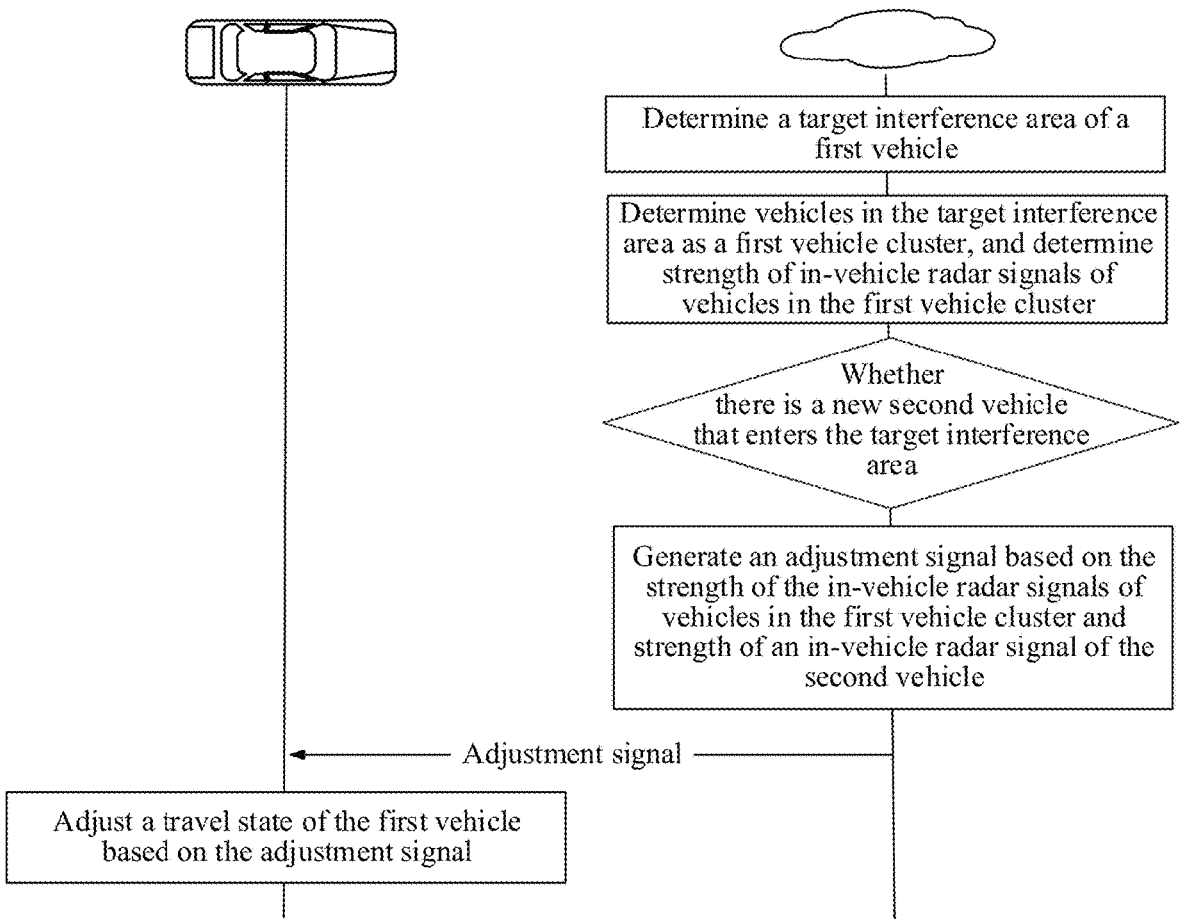
FIG. 2D is a schematic diagram of example interaction of an in-vehicle radar signal control method according to certain embodiment(s) of the present disclosure.

FIG. 2D is a schematic diagram of example interaction of an in-vehicle radar signal control method 20 according to an embodiment of the present disclosure.

Scenario 200-1 shows interference of another driving vehicle on an in-vehicle radar signal of a gray vehicle when the gray vehicle drives on a road. As can be seen from the scenario 200-1, when the gray vehicle drives on the right and transmits an in-vehicle radar signal, a vehicle before the gray vehicle also transmits an in-vehicle radar signal. The in-vehicle radar signal transmitted by the vehicle before the gray vehicle interferes with an echo (shown by a dashed line in the scenario 200-1) that the gray vehicle wants to detect. Besides, an in-vehicle radar signal transmitted by a vehicle in an opposite direction also interferes with the echo. In addition, the vehicle in the opposite direction also reflects an echo, and the echo reflected by the vehicle in the opposite direction also interferes with the echo that the gray vehicle wants to detect.

Scenario 200-2 also shows interference of another driving vehicle on an in-vehicle radar signal of a gray vehicle when the gray vehicle drives on a road. As can be seen from the scenario 200-2, when the gray vehicle drives on the right and transmits an in-vehicle radar signal, a vehicle that drives away from the gray vehicle (this vehicle does not pose a risk to driving safety of the gray vehicle) also interferes with the echo that the gray vehicle wants to detect.

Scenario 200-3 shows interference of a white vehicle looking for a parking space in a parking lot on an in-vehicle radar signal of a gray vehicle when the gray vehicle wants to park. When the gray vehicle wants to park, echoes that the gray vehicle wants to detect are echoes reflected by other vehicles parking before and after a parking space, so as to avoid that the gray vehicle collides with the other vehicles during parking. However, a white vehicle looking for a parking space may also transmit in-vehicle radar signals, and the signals also interfere with the echo that the gray vehicle wants to detect.

A person skilled in the art understands that the above three scenarios are only examples, and scenarios of interference on the echo that the gray vehicle wants to detect are not limited to the above three scenarios.

In certain existing art, neither the gray vehicle nor the white vehicle adjusts strength of the respective in-vehicle radar signal. Even if adjustment is made, adjustment is made randomly, which causes interference between radar signals of the gray vehicle and the white vehicle. As a result, the detected echo is not accurate enough, which affects identification of a driving risk.

Therefore, the embodiments of the present disclosure provide an in-vehicle radar signal control method 20, which can dynamically and intelligently control an in-vehicle radar signal. Therefore, a vehicle or a traffic control department can more accurately know a possible driving risk and reduce the probability of traffic accidents.

As shown in FIG. 2B, the in-vehicle radar signal control method 20 according to the present disclosure includes the following steps. The method 20 may be performed by a computing module in any white vehicle shown in FIG. 2C, or may be performed by a cloud server of a traffic control department, or may be performed by a combination thereof. That is, each of the following steps may be performed by a computing module/processor of a first vehicle or by a server, which is not limited in the present disclosure.

In the following description, a first vehicle is used as an example of the white vehicle, and a second vehicle is used as an example of the gray vehicle.

Step S201: Determine a target interference area of the first vehicle, a vehicle in the target interference area interfering with an in-vehicle radar signal of the first vehicle.

As shown in FIG. 2C, there are multiple white vehicles in the target interference area, and each of the multiple white vehicles may interfere with an echo that another vehicle wants to detect. The first vehicle may be any vehicle in the target interference area, which is not limited in the present disclosure.

For example, the target interference area may be determined as an area within a safety distance from the front, rear, left, and right sides of the first vehicle. The safety distance depends on road conditions, for example, the safety distance may be relatively short on a road with an intermediate or a low speed in a city, while the safety distance may be relatively long on a highway.

In another example, the target interference area may also be determined as an area formed by a number of vehicles closest to the first vehicle. Similarly, the number may depend on road conditions, for example, the number may be relatively large in a congested road section in a city, while the number may be relatively small in an open road section.

In another example, the target interference area may also be dynamically determined by a cloud server of a traffic control department based on an artificial intelligence neural network. A manner of determining the target interference area is not limited in the present disclosure, as long as the vehicle in the target interference area may interfere with the in-vehicle radar signal of the first vehicle.

Step S202: Determine vehicles in the target interference area as a first vehicle cluster, and determine strength of in-vehicle radar signals of vehicles in the first vehicle cluster.

For example, when step S202 is performed by a computing module of the first vehicle, the first vehicle may estimate or obtain the strength of the in-vehicle radar signals of the vehicles in the first vehicle cluster in various manners. The first vehicle cluster includes the first vehicle in the target interference area and a vehicle in the target interference area other than the first vehicle. For example, the first vehicle may send, to each vehicle in the target interference area, request information querying for the strength of the in-vehicle radar signal. In another example, the first vehicle may roughly estimate a sum of the strength of the in-vehicle radar signals of the vehicles by measuring a signal-to-noise ratio of the echo that the first vehicle wants to receive. In another example, the first vehicle may also query the server for the strength of the in-vehicle radar signals of the vehicles. A manner in which the first vehicle determines the strength of the in-vehicle radar signals of the vehicles in the first vehicle cluster is not limited in the present disclosure.

In another example, as shown in FIG. 2D, when step S202 is performed by the cloud server, the cloud server may sequentially query for the strength of the radar signals of the vehicles after determining the vehicles in the target interference area, or determine the strength of the radar signals of the vehicles in the first vehicle cluster by invoking the information from a related database. In another example, the cloud server may also estimate the strength of the radar signal of each vehicle through an artificial intelligence network based on a history record of each vehicle. A manner in which the server determines the strength of the in-vehicle radar signals of the vehicles in the first vehicle cluster is not limited in the present disclosure.

The strength of the in-vehicle radar signals of the vehicles in the target interference area may be measured by related components of the vehicles, or detected in other manners.

For example, multiple in-vehicle radar signal detection points may be disposed in a location of a roadside/signal lamp, and may detect in real time an in-vehicle radar signal passing through the road section. The cloud server may also collect in-vehicle radar signal feedback information from the vehicles, so as to obtain the in-vehicle radar signals of the vehicles in the target interference area in real time. A manner of measuring the strength of the in-vehicle radar signals of the vehicles in the target interference area is not limited in the present disclosure.

Step S203: Determine whether there is a new second vehicle that enters the target interference area.

As shown in FIG. 2C, it is assumed that a second vehicle (for example, a gray vehicle) is driving into the target interference area.

For example, when step S203 is performed by the computing module of the first vehicle, the computing module of the first vehicle may determine, in various manners, whether the second vehicle drives into the target interference area. For example, the first vehicle may find that the echo that the first vehicle wants to detect is greatly interfered with, and thus may determine that a second vehicle may drive into the target interference area. In another example, the first vehicle may receive related information from the second vehicle or the cloud or other vehicles in the target interference area, and these pieces of information indicate that the second vehicle drives into the target interference area. In another example, the first vehicle may detect, based on the in-vehicle radar signal of the first vehicle, that the second vehicle is about to drive into/has driven into the target interference area. A manner in which the first vehicle determines whether a second vehicle enters the target interference area is not limited in the present disclosure.

For example, when step S203 is performed by the server, as shown in FIG. 2D, the server may also determine, in various manners, whether the second vehicle drives into the target interference area. For example, the server may detect locations of the vehicles in the target interference area, to dynamically determine, based on artificial intelligence, a range of the target interference area and whether the second vehicle is included in the target interference area. In another example, the server may also receive related information from the second vehicle or the cloud or other vehicles in the target interference area, and these pieces of information indicate that the second vehicle drives into the target interference area. A manner in which the server determines whether a second vehicle enters the target interference area is not limited in the present disclosure.

Step S204: If determining that there is a second vehicle that enters the target interference area, obtain an adjustment signal, where the adjustment signal is generated based on strength of in-vehicle radar signals of vehicles in the first vehicle cluster and strength of an in-vehicle radar signal of the second vehicle.

The adjustment signal indicates to adjust the travel state of the first vehicle, and the adjustment of the travel state of the first vehicle includes at least one of the following items: increasing or reducing strength of the in-vehicle radar signal of the first vehicle, adjusting a travel speed of the first vehicle, and adjusting a travel direction of the first vehicle; and For example, when step S204 is performed by the computing module of the first vehicle, the computing module of the first vehicle may obtain the adjustment signal. For example, the first vehicle may receive the adjustment signal from a server. In another example, the computing module of the first vehicle may generate the adjustment signal through a built-in neural network module. A manner in which the first vehicle determines whether a second vehicle enters the target interference area is not limited in the present disclosure.

For example, when step S204 is performed by the server, as shown in FIG. 2D, the server may also generate the adjustment signal in various manners. Next, the server sends the adjustment signal to the first vehicle to adjust the travel state of the first vehicle.

For example, an example process of generating the adjustment signal by the first vehicle and the server may be briefly described below and the process of generating the adjustment signal is described in detail later in FIG. 3A and FIG. 3B. For example, the generating the adjustment signal may include: determining, based on a position of each vehicle in the first vehicle cluster, a first spatial volume occupied by the first vehicle cluster in the target interference area; determining, based on the strength of the in-vehicle radar signals of the vehicles in the first vehicle cluster and the first spatial volume, first signal strength spatial density corresponding to the first vehicle cluster in the target interference area; determining a combination of the first vehicle cluster and the second vehicle as a second vehicle cluster, and determining, based on a position of the second vehicle and strength of in-vehicle radar signals of vehicles in the second vehicle cluster, a second spatial volume occupied by the second vehicle cluster; determining, based on the strength of the in-vehicle radar signals of the vehicles in the second vehicle cluster and the second spatial volume, second signal strength spatial density corresponding to the second vehicle cluster; determining, based on the first signal strength spatial density and the second signal strength spatial density, impact of entry of the second vehicle into the target interference area on signal density in the target interference area; and generating the adjustment signal based on the impact of the entry of the second vehicle into the target interference area on the signal density in the target interference area.

The generating the adjustment signal based on the first signal strength spatial density and the second signal strength spatial density further includes: determining, based on the first signal strength spatial density and the second signal strength spatial density, impact of entry of the second vehicle into the target interference area on signal density in the target interference area; and generating the adjustment signal based on the impact of the entry of the second vehicle into the target interference area on the signal density in the target interference area, so that the impact of the entry of the second vehicle into the target interference area on the signal density in the target interference area facilitates driving safety of the first vehicle.

The generating the adjustment signal based on the first signal strength spatial density and the second signal strength spatial density may include: correcting the first signal strength spatial density and the second signal strength spatial density based on a history malfunction rate of an in-vehicle radar of the first vehicle; and generating the adjustment signal based on the corrected first signal strength spatial density and the corrected second signal strength spatial density.

The generating the adjustment signal based on the corrected first signal strength spatial density and the corrected second signal strength spatial density includes: determining, based on the corrected first signal strength spatial density and the corrected second signal strength spatial density, impact of entry of the second vehicle into the target interference area on signal density in the target interference area; and generating the adjustment signal based on the impact of the entry of the second vehicle into the target interference area on the signal density in the target interference area, so that the impact of the entry of the second vehicle into the target interference area on the signal density in the target interference area facilitates driving safety of the first vehicle.

The generating the adjustment signal based on the first signal strength spatial density and the second signal strength spatial density may include: determining a traffic accident rate in the target interference area; determining impact of the entry of the second vehicle into the target interference area on a driving safety index in the target interference area based on the traffic accident rate; determining, based on the first signal strength spatial density and the second signal strength spatial density, the impact of the entry of the vehicle into the target interference area on the signal density in the target interference area; and generating the adjustment signal based on the impact on the driving safety index in the target interference area and the impact on the signal density in the target interference area. The adjustment signal functions so that the impact on the driving safety index in the target interference area is less than or equal to the impact of the entry of the second vehicle into the target interference area on the signal density in the target interference area.

As shown in FIG. 2D, the first vehicle adjusts the travel state according to the adjustment signal. For example, adjusting the travel state of the first vehicle includes at least one of the following items: increasing or reducing strength of the in-vehicle radar signal of the first vehicle, adjusting a travel speed of the first vehicle, and adjusting a travel direction of the first vehicle.

If it is determined that there is a second vehicle that enters the target interference area, it may be determined that interference in the target interference area increases at a high probability. Therefore, according to the strength of the in-vehicle radar signals of the vehicles in the target interference area and strength of an in-vehicle radar signal of the second vehicle, it may be determined whether to increase or reduce the strength of the in-vehicle radar signal of the first vehicle, or how much the strength of the in-vehicle radar signal of the first vehicle is increased by. In addition, the adjustment signal may also instruct the first vehicle to slow down, speed up, or change the travel direction, or the like, so that the range of the target interference area is changed to improve driving safety.

For example, it is assumed that a number of the vehicles in the first vehicle cluster is n, the first spatial volume is $V_{n-1}$, the second spatial volume is $V_n$; the strength of the in-vehicle radar signals of the vehicles in the first vehicle cluster other than the first vehicle is $d_1, d_2, \ldots, d_{n-1}$ respectively, the strength of the in-vehicle radar signal of the first vehicle is $d_0$, the strength of the in-vehicle radar signal of the second vehicle is $d_n$, the history malfunction rate of the in-vehicle radar of the first vehicle is $p_{malfunction}$ and the traffic accident rate is $p_{vehicle}$.

Therefore, the determining the first signal strength spatial density corresponding to the area including the vehicles in the first vehicle cluster further includes: determining the first signal strength spatial density as $E_{n-1}$ based on a formula $$E_{n-1} = \frac{(d_0 + d_1 + d_2 + \ldots + d_{n-1})}{V_{n-1}}.$$

For example, the determining the second signal strength spatial density corresponding to the area including the vehicles in the second vehicle cluster further includes: determining the second signal strength spatial density as $E_n$ based on a formula $$E_n = \frac{(d_0 + d_1 + d_2 + \ldots + d_n)}{V_n}.$$

For example, the correcting the first signal strength spatial density and the second signal strength spatial density further includes: correcting the first signal strength spatial density to $E'_{n-1}$ based on a formula $$E'_{n-1} = (1 - p_{malfunction})\frac{(d_0 + d_1 + d_2 + \ldots + d_{n-1})}{V_{n-1}};$$

and correcting the second signal strength spatial density to $E'_n$ based on a formula $$E'_n = (1 - p_{malfunction})\frac{(d_0 + d_1 + d_2 + \ldots + d_n)}{V_n}.$$

For example, the determining impact of the entry of the second vehicle into the target interference area on a driving safety index in the target interference area further includes: determining the impact on the driving safety index in the target interference area as $\Delta p_{vehicle}$ based on a formula $$\Delta p_{vehicle} = \frac{\left((1 - (1 - p_{vehicle})^n) - (1 - (1 - p_{vehicle})^{n-1})\right)}{\left(1 - (1 - p_{vehicle})^{n-1}\right)}.$$

For example, the determining the impact of the entry of the vehicle into the target interference area on the signal density in the target interference area further includes: determining the impact of the entry of the vehicle into the target interference area on the signal density in the target interference area as $\Delta E$ based on a formula $$\Delta E = \frac{(E'_n - \prime E_{n-1})}{E'_{n-1}}.$$

For example, the generating the adjustment signal based on the impact on the driving safety index in the target interference area and the impact on the signal density in the target interference area further includes: in response to a determination of $\Delta E < \Delta p_{vehicle}$, generating an adjustment signal that indicates increasing the strength of the in-vehicle radar signal of the first vehicle, or generating an adjustment signal that adjusts the travel speed or the travel direction of the first vehicle, so that the first vehicle drives away from the target interference area as soon as possible.

The in-vehicle radar signal control method 20 provided in this embodiment of the present disclosure can dynamically and intelligently control the in-vehicle radar signal, so that a vehicle or a traffic control department can more accurately know a possible driving risk and reduce a probability of traffic accidents.

Figure 3A:
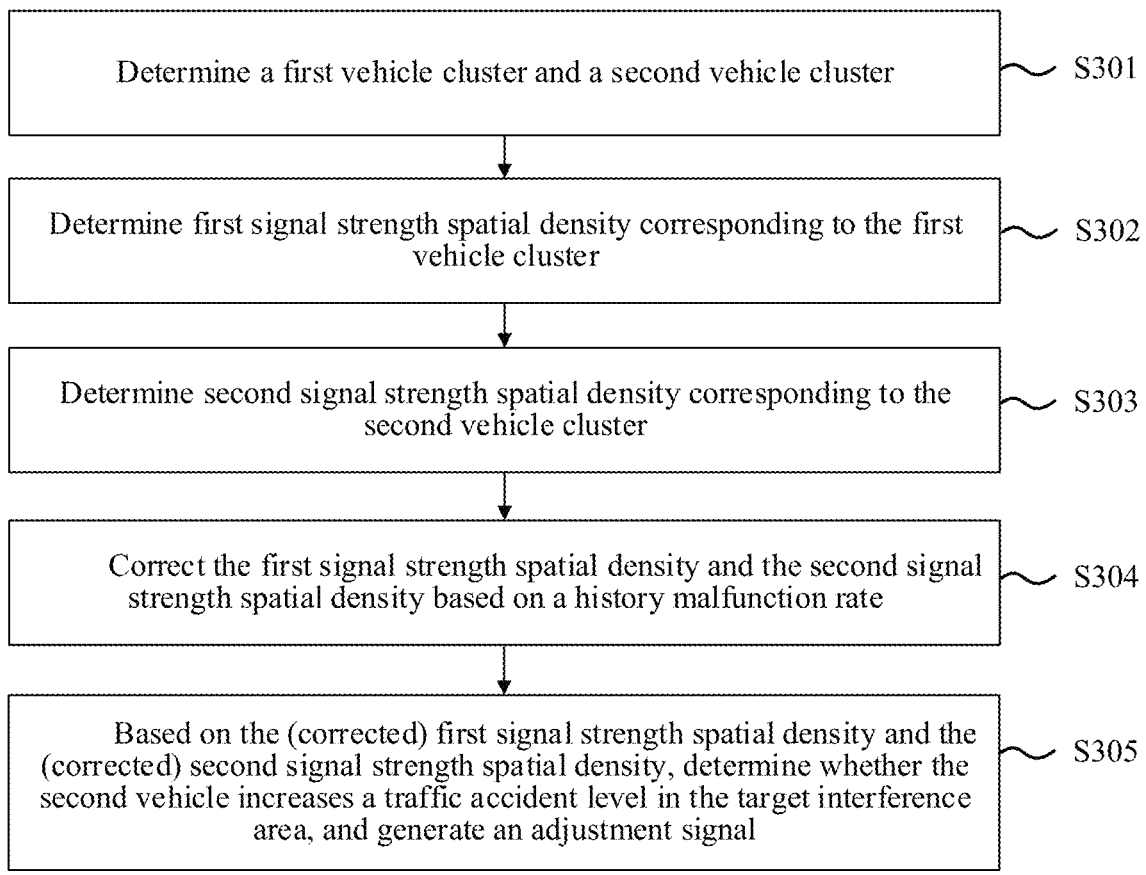
FIG. 3A is a schematic flowchart of a process of generating an adjustment signal according to certain embodiment(s) of the present disclosure.

FIG. 3A is a flowchart of a process 30 of generating an adjustment signal according to an embodiment of the present disclosure. FIG. 3B is a schematic diagram of a process 30 of generating an adjustment signal according to an embodiment of the present disclosure.

As shown in FIG. 3A, the process of generating the adjustment signal may include the following steps:

Step S301: Determine a first vehicle cluster and a second vehicle cluster.

The first vehicle cluster, as described in step S202, may be a set of vehicles in the target interference area. A schematic diagram of the first vehicle cluster may be shown in FIG. 3B. It is assumed that the target interference area includes n vehicles (n is zero or a positive integer). The first vehicle in the target interference area is called a vehicle 0, and vehicles in the target interference area other than the first vehicle are called vehicle 1, 2, . . . , n-1 respectively. The first vehicle cluster includes the vehicle 0 representing the first vehicle and the vehicles 1, 2, . . . , n-1 in the target interference area other than the first vehicle. Each vertex of a convex polyhedron shown in FIG. 3B is a vehicle (a vehicle generally has a group of in-vehicle radars).

Figure 3B:
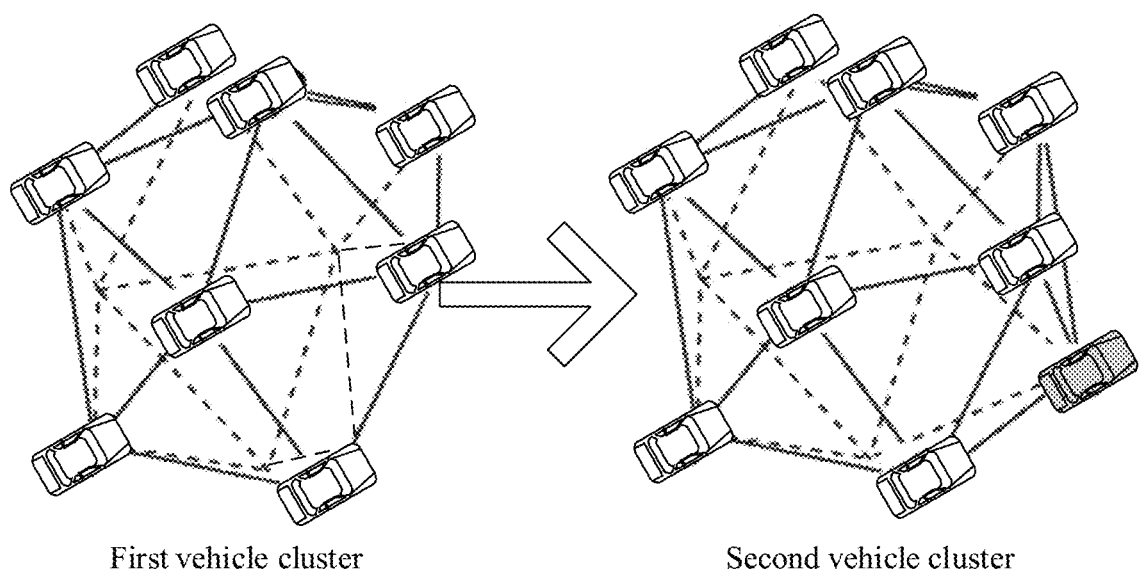
FIG. 3B is a schematic diagram of a process of generating an adjustment signal according to certain embodiment(s) of the present disclosure.

Referring to FIG. 3B, the second vehicle cluster may include the first vehicle cluster and the second vehicle, and the second vehicle is identified as a gray vehicle in FIG. 3B. In the following description, to make the formula more concise, the second vehicle is also described as a vehicle n.

Step S302: Determine first signal strength spatial density corresponding to the first vehicle cluster.

For example, a first spatial volume of the target interference area may be determined based on a position of each vehicle in the first vehicle cluster; and the first signal strength spatial density corresponding to the target interference area may be determined based on the strength of the in-vehicle radar signals of the vehicles in the first vehicle cluster and the first spatial volume.

As shown in FIG. 3B, the first spatial volume is a convex polyhedron that may accommodate the first vehicle cluster. After the computing module of the first vehicle and/or the server obtains locations and altitudes of other vehicles, the first spatial volume may be uniquely determined. The first spatial volume may be obtained with any geometric tool that may calculate a convex polyhedron. This is not limited in the present disclosure. The first spatial volume is denoted as $V_{n-1}$ below.

Next, the strength of the in-vehicle radar signals of the vehicles 1,2, . . . , n-1 is denoted as $d_1$, $d_2$, . . . , $d_{n-1}$ respectively, and the strength of the in-vehicle radar signal of the current vehicle is denoted as $d_0$. The first signal strength spatial density (the signal strength spatial density may also be called kinetic energy spatial density) corresponding to the first vehicle cluster may be calculated with the following formula (1).

$$E_{n-1} = \frac{(d_0 + d_1 + d_2 + \ldots + d_{n-1})}{V_{n-1}} \quad (1)$$

Step S303: Determine second signal strength spatial density corresponding to the second vehicle cluster.

For example, a combination of the first vehicle cluster and the second vehicle may be determined as the second vehicle cluster, and a second spatial volume corresponding to an area including vehicles in the second vehicle cluster may be determined based on a position of the second vehicle and strength of in-vehicle radar signals of vehicles in the second vehicle cluster; and the second signal strength spatial density corresponding to the area including the vehicles in the second vehicle cluster may be determined based on the strength of the in-vehicle radar signals of the vehicles in the second vehicle cluster and the second spatial volume.

As shown in FIG. 3B, the second spatial volume is a convex polyhedron that may accommodate the second vehicle cluster. After the computing module of the first vehicle and/or the server obtains a location and an altitude of the second vehicle, the second spatial volume may be uniquely determined. The second spatial volume is denoted as $V_n$. The strength of the in-vehicle radar signal of the second vehicle (that is, the gray vehicle or the vehicle n) is denoted as $d_n$. The second signal strength spatial density corresponding to the second vehicle cluster may be calculated with the following formula (2).

$$E_n = \frac{(d_0 + d_1 + d_2 + \ldots + d_n)}{V_n} \quad (2)$$

Step S304: Correct the first signal strength spatial density and the second signal strength spatial density based on a history malfunction rate of an in-vehicle radar of the first vehicle.

The first vehicle and/or the cloud server may determine in real time the history malfunction rate of the in-vehicle radar (for example, the in-vehicle radar is a component of the vehicle) according to history data. The history malfunction rate is denoted as $p_{malfunction}$. For example, the history malfunction rate may be a history malfunction rate counted based on a model/radar model of the first vehicle. In addition, the first vehicle and/or the cloud server may also correct the first signal strength spatial density and the second signal strength spatial density based on other data, which is not limited in the present disclosure.

For example, the corrected first signal strength spatial density may be calculated according to the following formula (3), and is denoted as $E'_{n-1}$.

$$E'_{n-1} = (1 - p_{malfunction}) \frac{(d_0 + d_1 + d_2 + \ldots + d_{n-1})}{V_{n-1}} \quad (3)$$

For example, the corrected second signal strength spatial density may be calculated according to the following formula (4), and is denoted as $E'_n$.

$$E'_n = (1 - p_{malfunction}) \frac{(d_0 + d_1 + d_2 + \ldots + d_n)}{V_n} \quad (4)$$

Step S305: Based on the (corrected) first signal strength spatial density and the (corrected) second signal strength spatial density, determine whether the second vehicle increases a traffic accident level in the target interference area, and generate an adjustment signal.

For example, step S305 may include: determining a traffic accident rate in the target interference area; determining impact of the entry of the second vehicle into the target interference area on a driving safety index in the target interference area based on the traffic accident rate; determining, based on the first signal strength spatial density and the second signal strength spatial density (or based on the corrected first signal strength spatial density and the corrected second signal strength spatial density), impact of entry of the vehicle into the target interference area on signal density in the target interference area; and generating the adjustment signal based on the impact on the driving safety index in the target interference area and the impact on the signal density in the target interference area.

The traffic accident rate reflects a probability that any vehicle in the target interference area is involved in a traffic accident, and may be either a previous traffic accident probability on the road section, or a traffic accident probability on the road section in a driving period of the first vehicle predicted based on various factors. The first vehicle and/or the cloud server may determine the traffic accident rate in the target interference area in various manners. For example, the first vehicle may receive the traffic accident rate from the cloud server. The cloud server may obtain the traffic accident rate by querying a database. Alternatively, the cloud server may predict a traffic accident probability in the current location in the current period through a built-in artificial intelligence module, and substitute the traffic accident probability into a subsequent formula as the traffic accident rate for operation. An obtaining method and a calculation method of the traffic accident rate are not limited in the present disclosure. The traffic accident rate is denoted as $p_{vehicle}$ below.

As shown in FIG. 3B, the vehicle n that enters the target interference area (shown as the gray vehicle) changes the pattern of the vehicles in the target interference area. Therefore, driving of the second vehicle into the target interference area affects driving safety in the area. The impact of the entry of the second vehicle into the target interference area on a driving safety index in the target interference area is denoted as $\Delta p_{vehicle}$ below. An vehicle may be calculated with the following formula (5).

$$\Delta p_{vehicle} = \frac{\left((1-(1-p_{vehicle})^n)-\left(1-(1-p_{vehicle})^{n-1}\right)\right)}{\left(1-(1-p_{vehicle})^{n-1}\right)} \quad (5)$$

The vehicle n (shown as the gray vehicle) that enters the target interference area also changes the first signal strength spatial density to the second signal strength spatial density, and a change rate of the second signal strength spatial density relative to the first signal strength spatial density is used as impact of entry of the vehicle into the target interference area on signal density in the target interference area, and is denoted as $\Delta E$. $\Delta E$ may be calculated with the following formula (6).

$$\Delta E = \frac{(E_n - E_{n-1})}{E_{n-1}} \quad (6)$$

If $\Delta E \geq \Delta p_{vehicle}$, the increase of the signal strength spatial density of the in-vehicle radar cluster by the second vehicle can offset the increase of the traffic accident rate, which can maintain the traffic accident level at the current level. Otherwise, the increase of the signal strength spatial density of the in-vehicle radar cluster by the second vehicle cannot offset the increase of the traffic accident rate, which increases the current traffic accident level at a high probability.

A corresponding adjustment signal may be generated in the following manners, to control the strength of any one of the in-vehicle radar signals of the vehicles, the first vehicle, and the second vehicle (that is, the vehicles 1,2, ... , n) in the target interference area, or control the travel state of any one of the vehicles 1,2, ... , n.

Manner 1: Keep $E_{n-1}$ unchanged, and while keeping the second spatial volume $V_n$ unchanged, only the strength $d_n$ of the in-vehicle radar signal of the second vehicle is increased, to increase $E_n$ until $\Delta E \geq \Delta p_{vehicle}$ In this manner, the adjustment signal instructs the second vehicle to increase the strength of the in-vehicle radar signal.

Manner 2: Keep $E_{n-1}$ unchanged, and while keeping the strength $d_n$ of the in-vehicle radar signal of the second vehicle unchanged, only the second spatial volume $V_n$ is reduced, to increase $E_n$ until $\Delta E \geq \Delta p_{vehicle}$. The second spatial volume $V_n$ may be reduced in various manners, for example, the vehicles in the target interference area are notified to drive away from the target interference area as soon as possible.

Manner 3: Increase $E_{n-1}$ and increase $E_n$ (that is, the vehicles, the first vehicle, and the second vehicle in the target interference area (that is, the vehicles 1,2, ... , n) are notified to all increase the strength of the in-vehicle radar signals) until $\Delta E \geq p_{vehicle}$.

A person skilled in the art understands that the adjustment signal may also be generated in other manners. For example, while keeping the second spatial volume $V_n$ unchanged, only the strength $d_0$ of the in-vehicle radar signal of the first vehicle may be increased, to increase $E_n$ until $\Delta E \geq \Delta p_{vehicle}$ This is not limited in the present disclosure.

The following table shows simulation of the effect of implementation of the method 20 on the number of traffic accidents.

| Experimental order | If the method 20 is not applied, a number of traffic accidents caused by insufficient strength of the in-vehicle radar signal | If the method 20 is applied, a number of traffic accidents caused by insufficient strength of the in-vehicle radar signal |
| --- | --- | --- |
| First experiment | 32 | 17 |
| Second experiment | 32 | 14 |
| Third experiment | 35 | 14 |
| Fourth experiment | 32 | 14 |
| Fifth experiment | 36 | 18 |
| Sixth experiment | 31 | 19 |
| Seventh experiment | 31 | 16 |
| Eighth experiment | 34 | 19 |
| Ninth experiment | 36 | 18 |
| Tenth experiment | 35 | 19 |

As can be seen, in the method 20, a vehicle or a traffic control department can more accurately know a possible driving risk and reduce the probability of traffic accidents. In the method 20, after a vehicle enters the target interference area or when a vehicle is about to enter the target interference area, an original vehicle and the new vehicle that enters in the target interference area consider the impact of the new vehicle that enters on the driving safety index, and determine whether to adjust the strength of the in-vehicle radar signal and how to adjust the strength of the in-vehicle radar signal. In addition, the method 20 can also effectively provide an adjustment method that facilitates (maintains or reduces the existing driving risk) driving safety, thereby reducing traffic accidents.

Figure 4:
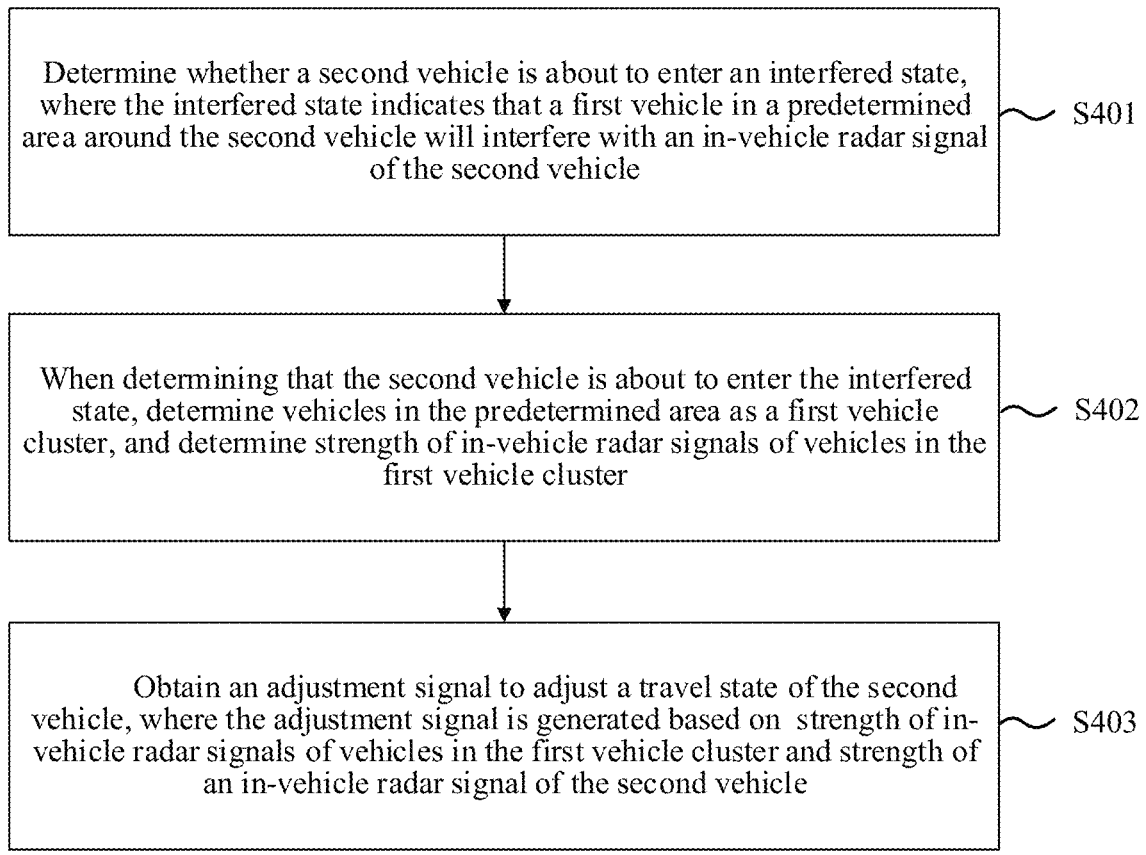
FIG. 4 is a schematic flowchart of an in-vehicle radar signal control method according to certain embodiment(s) of the present disclosure.

FIG. 4 is a flowchart of an in-vehicle radar signal control method 40 according to an embodiment of the present disclosure. The method 40 may be performed by a computing module in a gray vehicle (that is, the second vehicle) shown in FIG. 2C, or may be performed by a cloud server of a traffic control department, or may be performed by a combination thereof. That is, each of the following steps may be performed by a computing module/processor of the second vehicle or by a server, which is not limited in the present disclosure.

The method 40 includes the following steps.

Step S401: Determine whether a second vehicle is about to enter an interfered state, the interfered state indicating that a first vehicle in a predetermined area around the second vehicle will interfere with an in-vehicle radar signal of the second vehicle.

As shown in FIG. 2C, there are multiple white vehicles in the target interference area, and each of the multiple white vehicles may interfere with an echo that the second vehicle wants to detect. The first vehicle may be any vehicle in the target interference area, which is not limited in the present disclosure.

For example, the predetermined area around the second vehicle may be determined as an area within a safety distance from the second vehicle before a travel direction of the second vehicle. The safety distance depends on road conditions, for example, the safety distance may be relatively short on a road with an intermediate or a low speed in a city, while the safety distance may be relatively long on a highway.

In another example, the predetermined area around the second vehicle may also be determined as an area formed by a number of vehicles closest to the second vehicle. For example, in the scenario 200-3, when the second vehicle is ready to park, the number may be an area formed by vehicles that already park in other nearby parking spaces. Similarly, the number may depend on road conditions, for example, the number may be relatively large in a congested road section in a city, while the number may be relatively small in an open road section.

In another example, the target interference area may also be dynamically determined by a cloud server of a traffic control department based on an artificial intelligence neural network. A manner of determining the target interference area is not limited in the present disclosure, as long as the vehicle in the target interference area may interfere with the in-vehicle radar signal of the second vehicle.

Step S402: In response to a determination that the second vehicle is about to enter the interfered state, determine vehicles in the predetermined area as a first vehicle cluster, and determine strength of in-vehicle radar signals of vehicles in the first vehicle cluster, the first vehicle cluster including the first vehicle and a vehicle other than the first vehicle in a target interference area.

For example, when step S402 is performed by a computing module of the second vehicle, the second vehicle may estimate or obtain the strength of the in-vehicle radar signals of the vehicles in the first vehicle cluster in various manners. For example, the second vehicle may send, to each vehicle in the target interference area, request information querying for the strength of the in-vehicle radar signal. In another example, the second vehicle may roughly estimate a sum of the strength of the in-vehicle radar signals of the vehicles by measuring a signal-to-noise ratio of the echo that the second vehicle wants to receive. In another example, the second vehicle may also query the server for the strength of the in-vehicle radar signals of the vehicles. A manner in which the second vehicle determines the strength of the in-vehicle radar signals of the vehicles in the first vehicle cluster is not limited in the present disclosure.

In another example, when step S402 is performed by the cloud server, the cloud server may sequentially query for the strength of the radar signals of the vehicles after determining the vehicles in the first vehicle cluster, or determine the strength of the radar signals of the vehicles in the first vehicle cluster by invoking the information from a related database. In another example, the cloud server may also estimate the strength of the radar signal of each vehicle through an artificial intelligence network based on a history record of each vehicle. A manner in which the server determines the strength of the in-vehicle radar signals of the vehicles in the first vehicle cluster is not limited in the present disclosure.

The strength of the in-vehicle radar signals of the vehicles in the first vehicle cluster may be measured by related components of the vehicles, or detected in other manners. For example, multiple in-vehicle radar signal detection points may be disposed in a location of a roadside/signal lamp, and may detect in real time an in-vehicle radar signal passing through the road section. The cloud server may also collect in-vehicle radar signal feedback information from the vehicles, so as to obtain the in-vehicle radar signals of the vehicles in the target interference area in real time. A manner of measuring the strength of the in-vehicle radar signals in the first vehicle cluster is not limited in the present disclosure.

In step S403, an adjustment signal is obtained to adjust a travel state of the second vehicle, where the adjustment signal is generated based on strength of in-vehicle radar signals of vehicles in the first vehicle cluster and strength of an in-vehicle radar signal of the second vehicle.

The adjusting the travel state of the vehicle includes at least one of the following items: increasing strength of the in-vehicle radar signal of the second vehicle, adjusting a travel speed of the second vehicle, and adjusting a travel direction of the second vehicle.

The in-vehicle radar signal control method is performed by the second vehicle, and the obtaining an adjustment signal for adjusting the travel state of the second vehicle further includes: receiving the adjustment signal from a server or generating the adjustment signal by the second vehicle.

The in-vehicle radar signal control method is performed by a server, and the method further includes: transmitting, by the server, the adjustment signal to the second vehicle to adjust a travel state of the second vehicle.

The adjustment signal may be generated with reference to the process described in FIG. 3A and FIG. 3B.

For example, the generating the adjustment signal further includes: determining, based on a position of each vehicle in the first vehicle cluster, a first spatial volume of an area including the vehicles in the first vehicle cluster; determining, based on the strength of the in-vehicle radar signals of the vehicles in the first vehicle cluster and the first spatial volume, first signal strength spatial density corresponding to the area including the vehicles in the first vehicle cluster; determining a combination of the first vehicle cluster and the second vehicle as a second vehicle cluster, and determining, based on a position of the second vehicle and strength of in-vehicle radar signals of vehicles in the second vehicle cluster, a second spatial volume corresponding to an area including the vehicles in the second vehicle cluster; determining, based on the strength of the in-vehicle radar signals of the vehicles in the second vehicle cluster and the second spatial volume, second signal strength spatial density corresponding to the area including the vehicles in the second vehicle cluster; correcting the first signal strength spatial density and the second signal strength spatial density based on a history malfunction rate of an in-vehicle radar of the first vehicle or the second vehicle; and generating the adjustment signal based on the corrected first signal strength spatial density and the corrected second signal strength spatial density.

The generating the adjustment signal based on the corrected first signal strength spatial density and the corrected second signal strength spatial density further includes: determining impact of the entry of the second vehicle into the interfered state on the signal density in the predetermined area based on the corrected first signal strength spatial density and the corrected second signal strength spatial density; and generating the adjustment signal based on the impact of the entry of the second vehicle into the interfered state on the signal density in the predetermined area, so that the impact of the entry of the second vehicle into the interfered state on the signal density in the predetermined area facilitates driving safety of the first vehicle or the second vehicle.

The generating the adjustment signal based on the corrected first signal strength spatial density and the corrected second signal strength spatial density further includes: determining a traffic accident rate in a predetermined area; determining impact of the entry of the second vehicle into the interfered state on a driving safety index of the first vehicle in the predetermined area based on the traffic accident rate; determining impact of the entry of the second vehicle into the interfered state on the signal density in the predetermined area based on the corrected first signal strength spatial density and the corrected second signal strength spatial density; and generating the adjustment signal based on the impact on the driving safety index of the first vehicle and the impact on the signal density in the predetermined area, so that the impact on the driving safety index of the first vehicle is less than or equal to the impact on the signal density in the predetermined area.

For example, it is assumed that a number of the vehicles in the first vehicle cluster is n, the first spatial volume is $V_{n-1}$, the second spatial volume is $V_n$, the strength of the in-vehicle radar signals of the vehicles in the first vehicle cluster is $d_1, d_2, \ldots, d_{n-1}$ respectively, the strength of the in-vehicle radar signal of the second vehicle is $d_n$, the history malfunction rate of the in-vehicle radar of the first vehicle is $p_{malfunction}$, and the traffic accident rate is $p_{vehicle}$.

For example, the determining the first signal strength spatial density corresponding to the area including the vehicles in the first vehicle cluster further includes: determining the first signal strength spatial density as $E_{n-1}$ based on a formula $$E_{n-1} = \frac{(d_0 + d_1 + d_2 + \ldots + d_{n-1})}{V_{n-1}}.$$

For example, the determining the second signal strength spatial density corresponding to the area including the vehicles in the second vehicle cluster further includes: determining the second signal strength spatial density as $E_n$ based on a formula $$E_n = \frac{(d_0 + d_1 + d_2 + \ldots + d_n)}{V_n}.$$

For example, the correcting the first signal strength spatial density and the second signal strength spatial density further includes: correcting the first signal strength spatial density to $E'_{n-1}$ based on a formula $$E'_{n-1} = (1 - p_{malfunction})\frac{(d_0 + d_1 + d_2 + \ldots + d_{n-1})}{V_{n-1}};$$

and correcting the second signal strength spatial density to $E'_n$ based on a formula $$E'_n = (1 - p_{malfunction})\frac{(d_0 + d_1 + d_2 + \ldots + d_n)}{V_n}.$$

For example, the determining impact of the entry of the second vehicle into the interfered state on a driving safety index of the first vehicle further includes: determining the impact of the entry of the second vehicle into the interfered state on a driving safety index of the first vehicle as $\Delta p_{vehicle}$ based on a formula $$\Delta p_{vehicle} = \frac{\left((1 - (1 - p_{vehicle})^n) - (1 - (1 - p_{vehicle})^{n-1})\right)}{\left(1 - (1 - p_{vehicle})^{n-1}\right)}.$$

For example, the determining impact of the entry of the second vehicle into the interfered state on the signal density in the predetermined area further includes: determining the impact of the entry of the second vehicle into the interfered state on the signal density in the predetermined area as $\Delta E$ based on a formula $$\Delta E = \frac{(E'_n - E'_{n-1})}{E'_{n-1}}.$$

For example, the generating the adjustment signal based on the impact on the driving safety index of the first vehicle and the impact on the signal density in the predetermined area further includes: in response to a determination of $\Delta E < \Delta p_{vehicle}$, generating an adjustment signal that indicates increasing the strength of the in-vehicle radar signal of the second vehicle, or generating an adjustment signal that adjusts the travel speed or the travel direction of the second vehicle, so that the second vehicle enters a non-interfered state as soon as possible. For example, the non-interfered state indicates that a first vehicle in a predetermined area around the second vehicle will not interfere with an in-vehicle radar signal of the second vehicle.

In the method 40, a vehicle or a traffic control department can more accurately know a possible driving risk and reduce the probability of traffic accidents. In the method 40, after a vehicle enters the target interference area or when a vehicle is about to enter the target interference area, an original vehicle and the new vehicle that enters in the target interference area consider the impact of the new vehicle that enters on the driving safety, and determine whether to adjust the strength of the in-vehicle radar signal and how to adjust the strength of the in-vehicle radar signal. In addition, the method 40 can also effectively provide an adjustment method that facilitates (maintains or reduces the existing driving risk) driving safety, thereby reducing traffic accidents.

Figure 5:
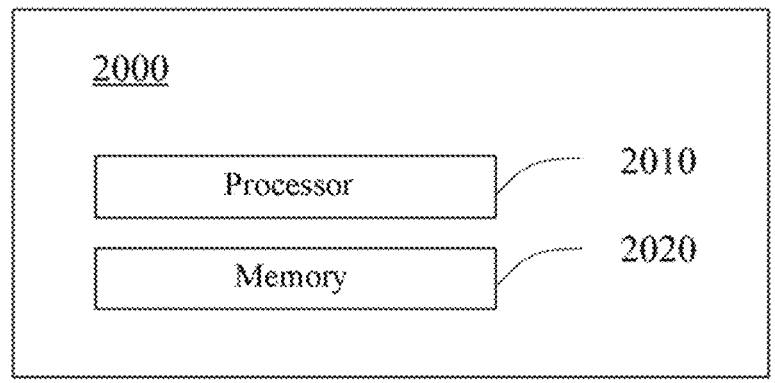
FIG. 5 is a schematic diagram of an electronic device according to certain embodiment(s) of the present disclosure.

According to still another aspect of the present disclosure, an electronic device is provided, configured to control an in-vehicle radar signal. FIG. 5 is a schematic diagram of an electronic device 2000 according to an embodiment of the present disclosure.

As shown in FIG. 5, the electronic device 2000 may include one or more processors 2010 and one or more memories 2020. The memory 2020 stores computer-readable code, and the computer-readable code, when executed by the one or more processors 2010, may perform the above in-vehicle radar signal control method.

The processor of this embodiment of the present disclosure may be an integrated circuit chip, and has a signal processing capability. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component, and may implement or perform the methods, the steps, and logic block diagrams that are disclosed in the embodiments of the present disclosure. The general-purpose processor may be a microprocessor, or the processor may be any suitable processor and the like and may be an X86 architecture or an ARM architecture.

In general, various exemplary embodiments of the present disclosure can be implemented in hardware or a dedicated circuit, software, firmware, logic, or any combination thereof. Some aspects can be implemented in hardware, while other aspects can be implemented in firmware or software executable by a controller, a microprocessor, or other computing devices. When various aspects of the embodiments of the present disclosure are illustrated or described as block diagrams, flowcharts, or represented by some other graphs, it is to be understood that the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

Figure 6:
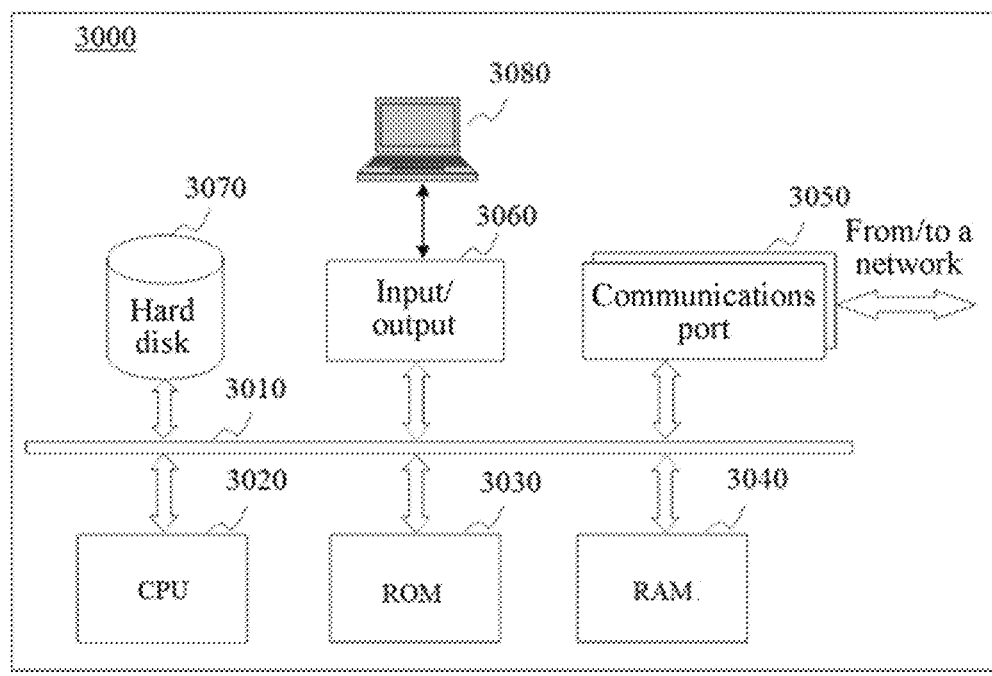
FIG. 6 is a schematic diagram of an architecture of an exemplary computing device according to certain embodiment(s) of the present disclosure.

For example, the method or the apparatus according to the embodiments of the present disclosure may also be implemented through the architecture of the computing device 3000 shown in FIG. 6. As shown in FIG. 6, the computing device 3000 may include a bus 3010, one or more CPUs 3020, a read-only memory (ROM) 3030, a random access memory (RAM) 3040, a communication port 3050 connected to a network, an input/output component 3060, a hard disk 3070, and the like. A storage device in the computing device 3000, such as a ROM 3030 or a hard disk 3070, may store various data or files used in processing and/or communication of the in-vehicle radar signal control method provided by the present disclosure and program instructions executed by the CPU. The computing device 3000 may further include a user interface 3080. In certain embodiment(s), the architecture shown in FIG. 6 is only exemplary, and when different devices are implemented, one or more components in the computing device shown in FIG. 6 may be omitted.

Figure 7:
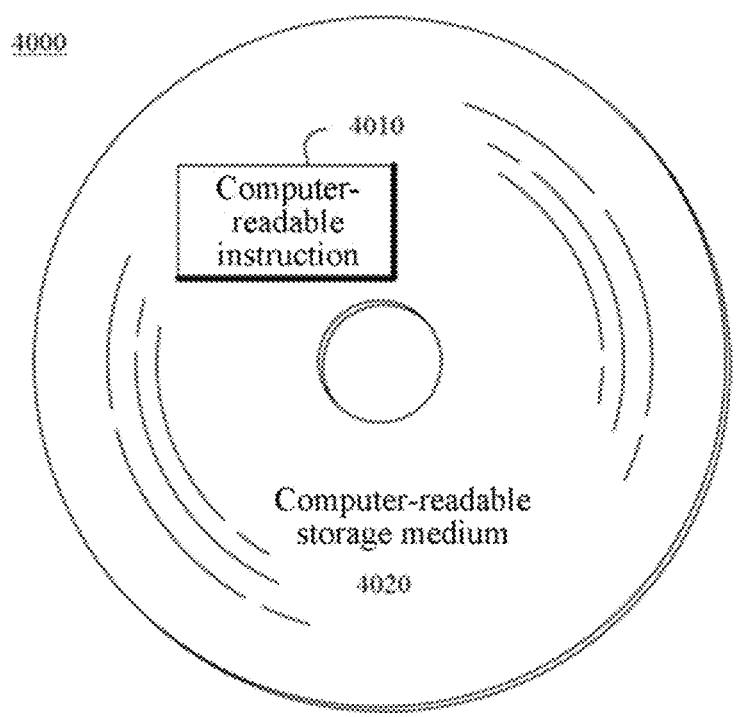
FIG. 7 is a schematic diagram of a storage medium according to certain embodiment(s) of the present disclosure.

According to still another aspect of the present disclosure, a computer-readable storage medium is further provided. FIG. 7 is a schematic diagram 4000 of a storage medium according to the present disclosure.

As shown in FIG. 7, the computer storage medium 4020 stores computer-readable instructions 4010. When the computer-readable instructions 4010 are executed by the processor, the in-vehicle radar signal control method according to the embodiments of the present disclosure described with reference to the above accompanying drawings may be performed. The computer-readable storage medium in the embodiments of the present disclosure may be a volatile memory or a non-volatile memory, or may include both a volatile memory and a non-volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), which is used as an external high-speed cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). The memory for the method described herein aims to include but not limited to these memories and any other suitable types of memories. The memory for the method described herein aims to include but not limited to these memories and any other suitable types of memories.

An embodiment of the present disclosure provides a computer program product or a computer program, including computer instructions, and the computer instructions being stored in a computer-readable storage medium. A processor of a computing device reads the computer instructions from the computer-readable storage medium, and executes the computer instructions, so that the computing device performs the in-vehicle radar signal control method according to the embodiments of the present disclosure.

Figure 8:
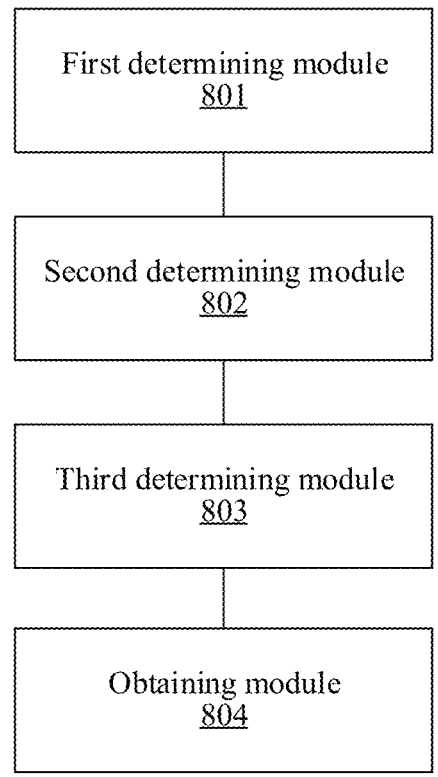
FIG. 8 is a schematic structural diagram of an in-vehicle radar signal control apparatus according to certain embodiment(s) of the present disclosure.

According to another aspect of the present disclosure, an in-vehicle radar signal control apparatus is provided. FIG. 8 is a schematic structural diagram of an in-vehicle radar signal control apparatus according to an embodiment of the present disclosure. As shown in FIG. 8, the apparatus includes: a first determining module 801, a second determining module 802, a third determining module 803, and an obtaining module 804. Functions of the modules are as follows:

The first determining module 801 is configured to determine a target interference area of a first vehicle, a vehicle in the target interference area interfering with an in-vehicle radar signal of the first vehicle.

The second determining module 802 is configured to determine vehicles in the target interference area as a first vehicle cluster, and determine strength of in-vehicle radar signals of vehicles in the first vehicle cluster, the first vehicle cluster including the first vehicle and a vehicle other than the first vehicle in the target interference area.

The third determining module 803 is configured to determine whether there is a second vehicle that enters the target interference area.

The obtaining module 804 is configured to: in response to a determination that there is a second vehicle that enters the target interference area, obtain an adjustment signal to adjust a travel state of the first vehicle, where the adjustment signal is generated based on strength of in-vehicle radar signals of vehicles in the first vehicle cluster and strength of an in-vehicle radar signal of the second vehicle.

In some embodiments, the obtaining module 804 is configured to receive the adjustment signal from a server, or generate the adjustment signal; and send, by the server, the adjustment signal to the first vehicle to adjust a travel state of the first vehicle.

In some embodiments, the obtaining module 804 is configured to determine, based on a position of each vehicle in the first vehicle cluster, a first spatial volume occupied by the first vehicle cluster; determine, based on the strength of the in-vehicle radar signals of the vehicles in the first vehicle cluster and the first spatial volume, first signal strength spatial density corresponding to the first vehicle cluster; determine a combination of the first vehicle cluster and the second vehicle as a second vehicle cluster, and determine, based on a position of the second vehicle and strength of in-vehicle radar signals of vehicles in the second vehicle cluster, a second spatial volume occupied by the second vehicle cluster; determine, based on the strength of the in-vehicle radar signals of the vehicles in the second vehicle cluster and the second spatial volume, second signal strength spatial density corresponding to the second vehicle cluster; determine, based on the first signal strength spatial density and the second signal strength spatial density, impact of entry of the second vehicle into the target interference area on signal density in the target interference area; and generate the adjustment signal based on the impact of the entry of the second vehicle into the target interference area on the signal density in the target interference area, so that the impact of the entry of the second vehicle into the target interference area on the signal density in the target interference area facilitates driving safety of the first vehicle.

In some embodiments, the obtaining module 804 is further configured to correct the first signal strength spatial density and the second signal strength spatial density based on a history malfunction rate of an in-vehicle radar of the first vehicle; determine the impact of the entry of the second vehicle into the target interference area on the signal density in the target interference area based on the corrected first signal strength spatial density and the corrected second signal strength spatial density; and generate the adjustment signal based on the impact of the entry of the second vehicle into the target interference area on the signal density in the target interference area, so that the impact of the entry of the second vehicle into the target interference area on the signal density in the target interference area facilitates driving safety of the first vehicle.

In some embodiments, the obtaining module 804 is further configured to determine a traffic accident rate in the target interference area; determine impact of the entry of the second vehicle into the target interference area on a driving safety index in the target interference area based on the traffic accident rate; determine, based on the first signal strength spatial density and the second signal strength spatial density, the impact of the entry of the second vehicle into the target interference area on the signal density in the target interference area; and generate the adjustment signal based on the impact on the driving safety index in the target interference area and the impact on the signal density in the target interference area, so that the impact on the driving safety index in the target interference area is less than or equal to the impact of the entry of the second vehicle into the target interference area on the signal density in the target interference area.

In some embodiments, a number of the vehicles in the first vehicle cluster is n, the first spatial volume is $V_{n-1}$, the second spatial volume is $V_n$, the strength of the in-vehicle radar signals of the vehicles in the first vehicle cluster other than the first vehicle is $d_1, d_2, \ldots, d_{n-1}$ respectively, the strength of the in-vehicle radar signal of the first vehicle is $d_0$, the strength of the in-vehicle radar signal of the second vehicle is $d_n$, the history malfunction rate of the in-vehicle radar of the first vehicle is $p_{malfunction}$, and the traffic accident rate is $p_{vehicle}$. The obtaining module 804 is further configured to determine the first signal strength spatial density as $E_{n-1}$ based on a formula $$E_{n-1} = \frac{(d_0 + d_1 + d_2 + \ldots + d_{n-1})}{V_{n-1}};$$

determine the second signal strength spatial density as $E_n$ based on a formula $$E_n = \frac{(d_0 + d_1 + d_2 + \ldots + d_n)}{V_n};$$

correct the first signal strength spatial density to $E'_{n-1}$ based on formula $$E'_{n-1} = (1 - p_{malfunction})\frac{(d_0 + d_1 + d_2 + \ldots + d_{n-1})}{V_{n-1}};$$

and correct the second signal strength spatial density to $E'_n$ based on a formula $$E_n = (1 - p_{malfunction})\frac{(d_0 + d_1 + d_2 + \ldots + d_n)}{V_n};$$

determine the impact on the driving safety index in the target interference area as $\Delta p_{vehicle}$ based on a formula $$\Delta p_{vehicle} = \frac{\left((1 - (1 - p_{vehicle})^n) - (1 - (1 - p_{vehicle})^{n-1})\right)}{\left(1 - (1 - p_{vehicle})^{n-1}\right)};$$

determine the impact of the entry of the vehicle into the target interference area on the signal density in the target interference area as $\Delta E$ based on a formula $$\Delta E = \frac{(E'_n - {'E}_{n-1})}{E'_{n-1}};$$

and in response to a determination of ΔE<Δp$_{vehicle}$, generate an adjustment signal that indicates increasing the strength of the in-vehicle radar signal of the first vehicle, or generate an adjustment signal that adjusts the travel speed or the travel direction of the first vehicle, so that the first vehicle drives away from the target interference area as soon as possible.

Figure 9:
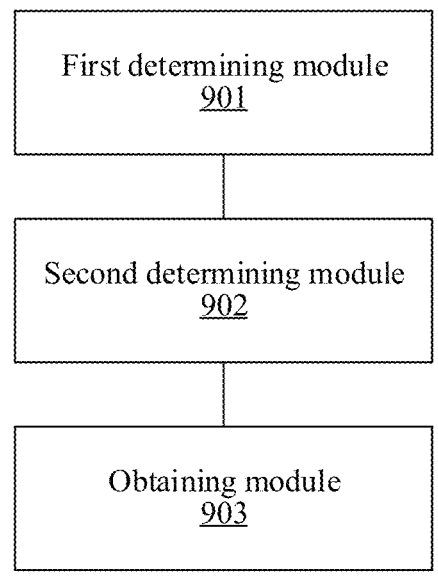
FIG. 9 is a schematic structural diagram of another in-vehicle radar signal control apparatus according to certain embodiment(s) of the present disclosure.

According to another aspect of the present disclosure, an in-vehicle radar signal control apparatus is provided. FIG. 9 is a schematic structural diagram of another in-vehicle radar signal control apparatus according to an embodiment of the present disclosure. As shown in FIG. 9, the apparatus includes: a first determining module 901, a second determining module 902, and an obtaining module 903. Functions of the modules are as follows:

The first determining module 901 is configured to determine whether a second vehicle is about to enter an interfered state, the interfered state indicating that a first vehicle in a predetermined area around the second vehicle will interfere with an in-vehicle radar signal of the second vehicle.

The second determining module 902 is configured to: in response to a determination that the second vehicle is about to enter the interfered state, determine vehicles in the predetermined area as a first vehicle cluster, and determine strength of in-vehicle radar signals of vehicles in the first vehicle cluster, the first vehicle cluster including the first vehicle and a vehicle other than the first vehicle in a target interference area.

The obtaining module 903 is configured to obtain an adjustment signal to adjust a travel state of the second vehicle, where the adjustment signal is generated based on strength of in-vehicle radar signals of vehicles in the first vehicle cluster and strength of an in-vehicle radar signal of the second vehicle.

In some embodiments, the obtaining module 903 is configured to receive the adjustment signal from a server, or generate the adjustment signal by the second vehicle.

In some embodiments, the obtaining module 903 is configured to send the adjustment signal to the second vehicle by the server, so as to adjust the travel state of the second vehicle.

In some embodiments, the obtaining module 903 is configured to determine, based on a position of each vehicle in the first vehicle cluster, a first spatial volume occupied by the first vehicle cluster; determine, based on the strength of the in-vehicle radar signals of the vehicles in the first vehicle cluster and the first spatial volume, first signal strength spatial density corresponding to the first vehicle cluster; determine a combination of the first vehicle cluster and the second vehicle as a second vehicle cluster, and determine, based on a position of the second vehicle and strength of in-vehicle radar signals of vehicles in the second vehicle cluster, a second spatial volume occupied by the second vehicle cluster; determine, based on the strength of the in-vehicle radar signals of the vehicles in the second vehicle cluster and the second spatial volume, second signal strength spatial density corresponding to the second vehicle cluster; correct the first signal strength spatial density and the second signal strength spatial density based on a history malfunction rate of an in-vehicle radar of the first vehicle or the second vehicle; determining impact of the entry of the second vehicle into the interfered state on the signal density in the predetermined area based on the corrected first signal strength spatial density and the corrected second signal strength spatial density; and generate the adjustment signal based on the impact of the entry of the second vehicle into the interfered state on the signal density in the predetermined area, so that the impact of the entry of the second vehicle into the interfered state on the signal density in the predetermined area facilitates driving safety of the first vehicle or the second vehicle.

In some embodiments, the obtaining module 903 is configured to determine a traffic accident rate in a predetermined area; determine impact of the entry of the second vehicle into the interfered state on a driving safety index of the first vehicle based on the traffic accident rate; determine impact of the entry of the second vehicle into the interfered state on the signal density in the predetermined area based on the corrected first signal strength spatial density and the corrected second signal strength spatial density; and generate the adjustment signal based on the impact on the driving safety index of the first vehicle and the impact on the signal density in the predetermined area, so that the impact on the driving safety index of the first vehicle is less than or equal to the impact on the signal density in the predetermined area.

In some embodiments, a number of the vehicles in the first vehicle cluster is n, the first spatial volume is $V_{n-1}$, the second spatial volume is $V_n$, the strength of the in-vehicle radar signals of the vehicles in the first vehicle cluster other than the first vehicle is $d_1, d_2, \ldots, d_{n-1}$ respectively, the strength of the in-vehicle radar signal of the first vehicle is $d_0$, the strength of the in-vehicle radar signal of the second vehicle is $d_n$, the history malfunction rate of the in-vehicle radar of the first vehicle is $p_{malfunction}$, and the traffic accident rate is $p_{vehicle}$. The obtaining module 903 determines the first signal strength spatial density as $E_{n-1}$ based on a formula $$E_{n-1} = \frac{(d_0 + d_1 + d_2 + \ldots + d_{n-1})}{V_{n-1}};$$

determines the second signal strength spatial density as $E_n$ based on a formula $$E_n = \frac{(d_0 + d_1 + d_2 + \ldots + d_n)}{V_n};$$

corrects the first signal strength spatial density to $E'_{n-1}$ based on a formula $$E'_{n-1} = (1 - p_{malfunction})\frac{(d_0 + d_1 + d_2 + \ldots + d_{n-1})}{V_{n-1}};$$

corrects the second signal strength spatial density to $E'_n$ based on a formula $$E_n = (1 - p_{malfunction})\frac{(d_0 + d_1 + d_2 + \ldots + d_n)}{V_n};$$

determines the impact of the entry of the second vehicle into the interfered state on the driving safety index of the first vehicle as $\Delta p_{vehicle}$ based on a formula $$\Delta p_{vehicle} = \frac{\left((1-(1-p_{vehicle})^n) - (1-(1-p_{vehicle})^{n-1})\right)}{\left(1-(1-p_{vehicle})^{n-1}\right)};$$

determines the impact of the entry of the second vehicle into the interfered state on the signal density in the predetermined area as ΔE based on a formula $$\Delta E = \frac{(E'_n - E'_{n-1})}{E'_{n-1}};$$

and in response to a determination of $\Delta E < \Delta p_{vehicle}$, generates an adjustment signal that indicates increasing the strength of the in-vehicle radar signal of the second vehicle, or generates an adjustment signal that adjusts the travel speed or the travel direction of the second vehicle, so that the second vehicle enters a non-interfered state as soon as possible, where the non-interfered state indicates that the first vehicle in the predetermined area around the second vehicle does not interfere with the in-vehicle radar signal of the second vehicle.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Flowcharts and block diagrams in the drawings illustrate architectures, functions, and operations that may be implemented by using the system, the method, and the computer program product according to the various embodiments of the present disclosure. In this regard, each block in the flowchart or the block diagram may represent a module, a program segment, or a part of a code. The module, the program segment, or the part of the code includes one or more executable instructions for implementing a specified logical function. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is to also be noted that, each block in the block diagram and/or the flowchart, and a combination of blocks in the block diagram and/or the flowchart, may be implemented by using a specific hardware-based system that performs specified functions or operations, or may be implemented by using a combination of special-purpose hardware and computer instructions.

In general, various exemplary embodiments of the present disclosure can be implemented in hardware or a dedicated circuit, software, firmware, logic, or any combination thereof. Some aspects can be implemented in hardware, while other aspects can be implemented in firmware or software executable by a controller, a microprocessor, or other computing devices. When various aspects of the embodiments of the present disclosure are illustrated or described as block diagrams, flowcharts, or represented by some other graphs, it is to be understood that the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

The example embodiments of the present disclosure described in detail above are illustrative only and not restrictive. A person skilled in the art understands that various modifications and combinations of the embodiments or features thereof may be made without departing from the principle and spirit of the present disclosure, and such modifications are intended to fall within the scope of the present disclosure.

What is claimed is:

1. An in-vehicle radar signal control method, comprising:
   determining a target interference area of a first vehicle, a vehicle in the target interference area interfering with an in-vehicle radar signal of the first vehicle;
   determining vehicles in the target interference area as a first vehicle cluster, and determining strength of in-vehicle radar signals of vehicles in the first vehicle cluster, the first vehicle cluster including the first vehicle and a vehicle other than the first vehicle in the target interference area;
   determining whether a new second vehicle enters the target interference area; and
   in response to a determination that the new second vehicle enters the target interference area, obtaining an adjustment signal, wherein the obtaining the adjustment signal further comprises:
      determining, based on strength of in-vehicle radar signals of vehicles in a second vehicle cluster and a second spatial volume occupied by the second vehicle cluster, second signal strength spatial density corresponding to the second vehicle cluster;
      determining, based on first signal strength spatial density and the second signal strength spatial density, impact of entry of the second vehicle into the target interference area on signal density in the target interference area; and
      generating the adjustment signal based on the impact of the entry of the second vehicle into the target interference area on the signal density in the target interference area, so that the impact of the entry of the second vehicle into the target interference area on the signal density in the target interference area facilitates driving safety of the first vehicle:
   the adjustment signal indicating one or more of: increasing or reducing strength of the in- vehicle radar signal of the first vehicle, adjusting a travel speed of the first vehicle, and adjusting a travel direction of the first vehicle; and
   the adjustment signal being generated based on the strength of the in-vehicle radar signals of the vehicles in the first vehicle cluster and strength of an in-vehicle radar signal of the second vehicle.

2. The method according to claim 1, wherein the in-vehicle radar signal control method is performed by the first vehicle, and obtaining the adjustment signal comprises:
   receiving the adjustment signal from a server or generating the adjustment signal by the first vehicle.

3. The method according to claim 1, wherein the in-vehicle radar signal control method is performed by a server, and the method further comprises:
   transmitting, by the server, the adjustment signal to the first vehicle to adjust a travel state of the first vehicle.

4. The method according to claim 3, wherein generating the adjustment signal further comprises:
   determining, based on a position of each vehicle in the first vehicle cluster, a first spatial volume occupied by the first vehicle cluster;
   determining, based on the strength of the in-vehicle radar signals of the vehicles in the first vehicle cluster and the first spatial volume, the first signal strength spatial density corresponding to the first vehicle cluster;

determining a combination of the first vehicle cluster and the second vehicle as the second vehicle cluster, and determining, based on a position of the second vehicle and the strength of the in-vehicle radar signals of the vehicles in the second vehicle cluster, the second spatial volume occupied by the second vehicle cluster.

5. The method according to claim 4, wherein generating the adjustment signal comprises:
correcting the first signal strength spatial density and the second signal strength spatial density based on a history malfunction rate of an in-vehicle radar of the first vehicle;
determining the impact of the entry of the second vehicle into the target interference area on the signal density in the target interference area based on the corrected first signal strength spatial density and the corrected second signal strength spatial density; and
generating the adjustment signal based on the impact of the entry of the second vehicle into the target interference area on the signal density in the target interference area, so that the impact of the entry of the second vehicle into the target interference area on the signal density in the target interference area facilitates driving safety of the first vehicle.

6. The method according to claim 4, wherein generating the adjustment signal comprises:
determining a traffic accident rate in the target interference area;
determining impact of the entry of the second vehicle into the target interference area on a driving safety index in the target interference area based on the traffic accident rate;
determining, based on the first signal strength spatial density and the second signal strength spatial density, the impact of the entry of the second vehicle into the target interference area on the signal density in the target interference area; and
generating the adjustment signal based on the impact on the driving safety index in the target interference area and the impact on the signal density in the target interference area, so that the impact on the driving safety index in the target interference area is less than or equal to the impact of the entry of the second vehicle into the target interference area on the signal density in the target interference area.

7. The method according to claim 6, wherein a number of the vehicles in the first vehicle cluster is n, the first spatial volume is $V_{n-1}$, the second spatial volume is $V_n$, the strength of the in-vehicle radar signals of the vehicles in the first vehicle cluster other than the first vehicle is $d_1, d_2, \ldots, d_{n-1}$ respectively, the strength of the in-vehicle radar signal of the first vehicle is $d_0$, the strength of the in-vehicle radar signal of the second vehicle is $d_n$, the history malfunction rate of the in-vehicle radar of the first vehicle is $p_{malfunction}$, and the traffic accident rate is $p_{vehicle}$;
wherein determining the first signal strength spatial density further comprises:
determining the first signal strength spatial density as $E_{n-1}$ based on a formula $$E_{n-1} = \frac{(d_0 + d_1 + d_2 + \ldots + d_{n-1})}{V_{n-1}};$$

wherein determining the second signal strength spatial density comprises:

determining the second signal strength spatial density as $E_n$ based on a formula $$E_n = \frac{(d_0 + d_1 + d_2 + \ldots + d_n)}{V_n};$$

wherein correcting the first signal strength spatial density comprises:
correcting the first signal strength spatial density to $E'_{n-1}$ based on a formula $$E'_{n-1} = (1 - p_{malfunction})\frac{(d_0 + d_1 + d_2 + \ldots + d_{n-1})}{V_{n-1}};$$

and
correcting the second signal strength spatial density to $E'_n$ based on a formula $$E_n = (1 - p_{malfunction})\frac{(d_0 + d_1 + d_2 + \ldots + d_n)}{V_n};$$

wherein determining the impact of the entry of the second vehicle into the target interference area on the driving safety index in the target interference area comprises:
determining the impact on the driving safety index in the target interference area as $\Delta p_{vehicle}$ based on a formula $$\Delta p_{vehicle} = \frac{\left((1 - (1 - p_{vehicle})^n) - (1 - (1 - p_{vehicle})^{n-1})\right)}{\left(1 - (1 - p_{vehicle})^{n-1}\right)};$$

wherein determining the impact of the entry of the vehicle into the target interference area on the signal density in the target interference area comprises:
determining the impact of the entry of the vehicle into the target interference area on the signal density in the target interference area as $\Delta E$ based on a formula $$\Delta E = \frac{(E'_n - \prime E_{n-1})}{E'_{n-1}};$$

wherein generating the adjustment signal comprises:
in response to a determination of $\Delta E < \Delta p_{vehicle}$, generating the adjustment signal that indicates increasing the strength of the in-vehicle radar signal of the first vehicle, or generating the adjustment signal that adjusts the travel speed or the travel direction of the first vehicle, so that the first vehicle drives away from the target interference area as soon as possible.

8. An in-vehicle radar signal control method, comprising:
determining whether a second vehicle is about to enter an interfered state, the interfered state indicating that a first vehicle in a predetermined area around the second vehicle will interfere with an in-vehicle radar signal of the second vehicle;
in response to a determination that the second vehicle is about to enter the interfered state, determining vehicles in the predetermined area as a first vehicle cluster, and determining strength of in-vehicle radar signals of vehicles in the first vehicle cluster, the first vehicle cluster including the first vehicle and a vehicle other than the first vehicle in a target interference area; and obtaining an adjustment signal, the adjustment signal indicating at least one of the following items: increasing or reducing strength of the in-vehicle radar signal of the second vehicle, adjusting a travel speed of the second vehicle, and adjusting a travel direction of the second vehicle, wherein the obtaining the adjustment signal comprises:

determining, based on strength of in-vehicle radar signals of vehicles in a second vehicle cluster and a second spatial volume occupied by the second vehicle cluster, second signal strength spatial density corresponding to the second vehicle cluster;

correcting a first signal strength spatial density and the second signal strength spatial density based on a history malfunction rate of an in-vehicle radar of the first vehicle or the second vehicle;

determining impact of entry of the second vehicle into the interfered state on a signal density in the predetermined area based on the corrected first signal strength spatial density and the corrected second signal strength spatial density; and generating the adjustment signal based on the impact of the entry of the second vehicle into the interfered state on the signal density in the predetermined area, so that the impact of the entry of the second vehicle into the interfered state on the signal density in the predetermined area facilitates driving safety of the first vehicle or the second vehicle; and the adjustment signal being obtained based on the strength of the in-vehicle radar signals of the vehicles in the first vehicle cluster and the strength of the in-vehicle radar signal of the second vehicle.

9. The method according to claim 8, wherein the in-vehicle radar signal control method is performed by the second vehicle, and obtaining the adjustment signal comprises:

receiving the adjustment signal from a server or generating the adjustment signal by the second vehicle.

10. The method according to claim 8, wherein the in-vehicle radar signal control method is performed by a server, and the method further comprises:

transmitting, by the server, the adjustment signal to the second vehicle to adjust a travel state of the second vehicle.

11. The method according to claim 10, wherein generating the adjustment signal comprises:

determining, based on a position of each vehicle in the first vehicle cluster, a first spatial volume occupied by the first vehicle cluster;

determining, based on the strength of the in-vehicle radar signals of the vehicles in the first vehicle cluster and the first spatial volume, the first signal strength spatial density corresponding to the first vehicle cluster;

determining a combination of the first vehicle cluster and the second vehicle as the second vehicle cluster, and determining, based on a position of the second vehicle and the strength of the in-vehicle radar signals of the vehicles in the second vehicle cluster, the second spatial volume occupied by the second vehicle cluster.

12. The method according to claim 11, wherein generating the adjustment signal comprises:

determining a traffic accident rate in the predetermined area;

determining impact of the entry of the second vehicle into the interfered state on a driving safety index of the first vehicle based on the traffic accident rate;

determining impact of the entry of the second vehicle into the interfered state on the signal density in the predetermined area based on the corrected first signal strength spatial density and the corrected second signal strength spatial density; and generating the adjustment signal based on the impact on the driving safety index of the first vehicle and the impact on the signal density in the predetermined area, so that the impact on the driving safety index of the first vehicle is less than or equal to the impact on the signal density in the predetermined area.

13. The method according to claim 12, wherein a number of the vehicles in the first vehicle cluster is n, the first spatial volume is $V_{n-1}$, the second spatial volume is $V_n$, the strength of the in-vehicle radar signals of the vehicles in the first vehicle cluster other than the first vehicle is $d_1, d_2, \ldots, d_{n-1}$ respectively, the strength of the in-vehicle radar signal of the first vehicle is $d_0$, the strength of the in-vehicle radar signal of the second vehicle is $d_n$, the history malfunction rate of the in-vehicle radar of the first vehicle is $P_{malfunction}$, and the traffic accident rate is $p_{vehicle}$;

wherein determining the first signal strength spatial density comprises:

determining the first signal strength spatial density as $E_{n-1}$ based on a formula $$E_{n-1} = \frac{(d_0 + d_1 + d_2 + \ldots + d_{n-1})}{V_n};$$

wherein determining the second signal strength spatial density comprises:

determining the second signal strength spatial density as $E_n$ based on a formula $$E_n = \frac{(d_0 + d_1 + d_2 + \ldots + d_n)}{V_n};$$

wherein correcting the first signal strength spatial density comprises:

correcting the first signal strength spatial density to $E'_{n-1}$ based on a formula $$E'_{n-1} = (1 - p_{malfunction})\frac{(d_0 + d_1 + d_2 + \ldots + d_{n-1})}{V_{n-1}};$$

and correcting the second signal strength spatial density to $E'_n$ based on a formula $$E'_n = (1 - p_{malfunction})\frac{(d_0 + d_1 + d_2 + \ldots + d_n)}{V_n};$$

wherein determining the impact of the entry of the second vehicle into the interfered state on the driving safety index of the first vehicle comprises:

determining the impact of the entry of the second vehicle into the interfered state on the driving safety index of the first vehicle as $\Delta p_{vehicle}$ based on a formula $$\Delta p_{vehicle} = \frac{\left((1-(1-p_{vehicle})^n)-(1-(1-p_{vehicle})^{n-1})\right)}{\left(1-(1-p_{vehicle})^{n-1}\right)};$$

wherein determining the impact of the entry of the second vehicle into the interfered state on the signal density in the predetermined area comprises:

determining the impact of the entry of the second vehicle into the interfered state on the signal density in the predetermined area as ΔE based on a formula $$\Delta E = \frac{(E'_n - E'_{n-1})}{E'_{n-1}};$$

wherein generating the adjustment signal comprises:

in response to a determination of $\Delta E < \Delta p_{vehicle}$, generating the adjustment signal that indicates increasing the strength of the in-vehicle radar signal of the second vehicle, or generating the adjustment signal that adjusts the travel speed or the travel direction of the second vehicle, so that the second vehicle enters a non-interfered state as soon as possible, wherein the non-interfered state indicates that the first vehicle in the predetermined area around the second vehicle does not interfere with the in-vehicle radar signal of the second vehicle.

14. An in-vehicle radar signal control apparatus, comprising: a memory storing computer program instructions; and a processor coupled to the memory and configured to execute the computer program instructions and perform:

determining a target interference area of a first vehicle, a vehicle in the target interference area interfering with an in-vehicle radar signal of the first vehicle;

determining vehicles in the target interference area as a first vehicle cluster, and determining strength of in-vehicle radar signals of vehicles in the first vehicle cluster, the first vehicle cluster including the first vehicle and a vehicle other than the first vehicle in the target interference area;

determining whether a new second vehicle enters the target interference area; and in response to a determination that the new second vehicle enters the target interference area, obtaining an adjustment signal, wherein the obtaining the adjustment signal comprises:

determining, based on strength of in-vehicle radar signals of vehicles in a second vehicle cluster and a second spatial volume occupied by the second vehicle cluster, second signal strength spatial density corresponding to the second vehicle cluster;

determining, based on a first signal strength spatial density and the second signal strength spatial density,-impact of entry of the second vehicle into the target interference area on signal density in the target interference area; and generating the adjustment signal based on the impact of the entry of the second vehicle into the target interference area on the signal density in the target interference area, so that the impact of the entry of the second vehicle into the target interference area on the signal density in the target interference area facilitates driving safety of the first vehicle;

the adjustment signal indicating one or more of: increasing or reducing strength of the in- vehicle radar signal of the first vehicle, adjusting a travel speed of the first vehicle, and adjusting a travel direction of the first vehicle; and the adjustment signal being generated based on the strength of the in-vehicle radar signals of the vehicles in the first vehicle cluster and strength of an in-vehicle radar signal of the second vehicle.

15. The apparatus according to claim 14, wherein the in-vehicle radar signal control method is performed by the first vehicle, and obtaining the adjustment signal includes:

receiving the adjustment signal from a server or generating the adjustment signal by the first vehicle.

16. The apparatus according to claim 14, wherein the in-vehicle radar signal control method is performed by a server, and wherein the processor is further configured to execute the computer program instructions and perform:

transmitting, by the server, the adjustment signal to the first vehicle to adjust a travel state of the first vehicle.

17. The apparatus according to claim 16, wherein generating the adjustment signal further includes:

determining, based on a position of each vehicle in the first vehicle cluster, a first spatial volume occupied by the first vehicle cluster;

determining, based on the strength of the in-vehicle radar signals of the vehicles in the first vehicle cluster and the first spatial volume, the first signal strength spatial density corresponding to the first vehicle cluster;

determining a combination of the first vehicle cluster and the second vehicle as the second vehicle cluster, and determining, based on a position of the second vehicle and the strength of the in-vehicle radar signals of the vehicles in the second vehicle cluster, the second spatial volume occupied by the second vehicle cluster.

18. The apparatus according to claim 17, wherein generating the adjustment signal includes:

correcting the first signal strength spatial density and the second signal strength spatial density based on a history malfunction rate of an in-vehicle radar of the first vehicle;

determining the impact of the entry of the second vehicle into the target interference area on the signal density in the target interference area based on the corrected first signal strength spatial density and the corrected second signal strength spatial density; and generating the adjustment signal based on the impact of the entry of the second vehicle into the target interference area on the signal density in the target interference area, so that the impact of the entry of the second vehicle into the target interference area on the signal density in the target interference area facilitates driving safety of the first vehicle.

19. The apparatus according to claim 17, wherein generating the adjustment signal includes:

determining a traffic accident rate in the target interference area;

determining impact of the entry of the second vehicle into the target interference area on a driving safety index in the target interference area based on the traffic accident rate;

determining, based on the first signal strength spatial density and the second signal strength spatial density, the impact of the entry of the second vehicle into the target interference area on the signal density in the target interference area; and generating the adjustment signal based on the impact on the driving safety index in the target interference area and the impact on the signal density in the target interference area, so that the impact on the driving safety index in the target interference area is less than or equal to the impact of the entry of the second vehicle into the target interference area on the signal density in the target interference area.

20. The apparatus according to claim 19, wherein a number of the vehicles in the first vehicle cluster is n, the first spatial volume is $V_{n-1}$, the second spatial volume is $V_n$, the strength of the in-vehicle radar signals of the vehicles in the first vehicle cluster other than the first vehicle is $d_1$, $d_2$, ..., $d_{n-1}$ respectively, the strength of the in-vehicle radar signal of the first vehicle is do, the strength of the in-vehicle radar signal of the second vehicle is $d_n$, the history malfunction rate of the in-vehicle radar of the first vehicle is $p_{malfunction}$, and the traffic accident rate is $p_{vehicle}$, wherein determining the first signal strength spatial density includes:

determining the first signal strength spatial density as $E_{n-1}$ based on a formula $$E_{n-1} = \frac{(d_0 + d_1 + d_2 + ... + d_{n-1})}{V_{n-1}};$$

wherein determining the second signal strength spatial density includes:

determining the second signal strength spatial density as $E_n$ based on a formula $$E_n = \frac{(d_0 + d_1 + d_2 + ... + d_n)}{V_n};$$

wherein correcting the first signal strength spatial density includes:

correcting the first signal strength spatial density to $E'_{n-1}$ based on a formula $$E'_{n-1} = (1 - p_{malfunction})\frac{(d_0 + d_1 + d_2 + ... + d_{n-1})}{V_{n-1}};$$

and correcting the second signal strength spatial density to $E'_n$ based on a formula $$E_n = (1 - p_{malfunction})\frac{(d_0 + d_1 + d_2 + ... + d_n)}{V_n};$$

wherein determining the impact of the entry of the second vehicle into the target interference area on the driving safety index in the target interference area includes:

determining the impact on the driving safety index in the target interference area as $\Delta p_{vehicle}$ based on a formula $$\Delta p_{vehicle} = \frac{\left((1-(1-p_{vehicle})^n) - (1-(1-p_{vehicle})^{n-1})\right)}{\left(1-(1-p_{vehicle})^{n-1}\right)};$$

wherein determining the impact of the entry of the vehicle into the target interference area on the signal density in the target interference area includes:

determining the impact of the entry of the vehicle into the target interference area on the signal density in the target interference area as $\Delta E$ based on a formula $$\Delta E = \frac{(E'_n - \prime E_{n-1})}{E'_{n-1}};$$

wherein generating the adjustment signal includes:

in response to a determination of $\Delta E < \Delta p_{vehicle}$, generating the adjustment signal that indicates increasing the strength of the in-vehicle radar signal of the first vehicle, or generating the adjustment signal that adjusts the travel speed or the travel direction of the first vehicle, so that the first vehicle drives away from the target interference area as soon as possible.

* * * * *